US009441795B2

(12) United States Patent
Segers et al.

(10) Patent No.: US 9,441,795 B2
(45) Date of Patent: Sep. 13, 2016

(54) LED LAMP WITH BALLAST DETECTION AND METHOD THEREOF

(71) Applicant: Silicon Hill B.V., Amsterdam (NL)

(72) Inventors: Maarten Willem Segers, Lochem (NL); Shounak Roy, Koog aan de Zaan (NL); Paul Steffens, Wermelskirchen (DE); Toon Groenendaal, Son (NL); Jurgen Honold, Amsterdam (NL)

(73) Assignee: Silicon Hill B.V., Amsterdam (NL)

( * ) Notice: Subject to any disclaimer, the term of this patent is extended or adjusted under 35 U.S.C. 154(b) by 0 days.

(21) Appl. No.: 14/669,062

(22) Filed: Mar. 26, 2015

(65) Prior Publication Data

US 2015/0198290 A1    Jul. 16, 2015

Related U.S. Application Data

(63) Continuation-in-part of application No. PCT/EP2014/070568, filed on Sep. 25, 2014.

(30) Foreign Application Priority Data

Sep. 25, 2013   (NL) ...................................... 2011495

(51) Int. Cl.
*F21K 99/00*   (2016.01)
*H05B 33/08*   (2006.01)

(52) U.S. Cl.
CPC ............. *F21K 9/175* (2013.01); *H05B 33/083* (2013.01); *H05B 33/0806* (2013.01);
(Continued)

(58) Field of Classification Search
CPC ..... F21K 9/175; F21K 9/10; H05B 33/0824; H05B 33/0827; H05B 33/083; H05B 33/0851
See application file for complete search history.

(56) References Cited

U.S. PATENT DOCUMENTS 5,463,280 A    10/1995  Johnson
6,853,151 B2    2/2005  Leong et al.
(Continued)

FOREIGN PATENT DOCUMENTS

CA       2856753 A1    5/2012
CN    201571219 U     9/2010
(Continued)

OTHER PUBLICATIONS

Earlier Search Report for priority document NL2011495 issued on May 7, 2014.
(Continued)

*Primary Examiner* — Tung X Le
*Assistant Examiner* — Raymond R Chai
(74) *Attorney, Agent, or Firm* — David P. Owen; Ramin Amirsehhi; Hoyng Rokh Monegier LLP

(57) ABSTRACT

An LED lamp arrangement adapted to replace a fluorescent lamp in a luminaire having a ballast for supplying power to the lamp. The LED lamp arrangement has LEDs arranged in groups. The groups of LEDs are connectable in plural circuit configurations, including at least a first circuit configuration, and a second circuit configuration having a different circuit arrangement of the groups of LEDs in which at least a portion of the groups of LEDs are connected into the circuit differently than in the first circuit configuration. The LED lamp arrangement further has a first circuit adapted to generate an output indicating whether the ballast is a magnetic ballast or a non-magnetic ballast, and a second circuit adapted to change a connection of the groups of LEDs between the first circuit configuration and the second circuit configuration on the basis of the output of the first circuit.

43 Claims, 9 Drawing Sheets

(52) U.S. Cl.
CPC ..... *H05B 33/0824* (2013.01); *H05B 33/0827* (2013.01); *H05B 33/0851* (2013.01); *Y02B 20/383* (2013.01); *Y02B 20/386* (2013.01)

(56) References Cited

U.S. PATENT DOCUMENTS

| | | | |
|---|---|---|---|
| 8,072,161 B2 | 12/2011 | Yang | |
| 8,760,064 B1* | 6/2014 | Yoon | H05B 33/0842 |
| | | | 315/185 R |
| 8,952,617 B2 | 2/2015 | Hui et al. | |
| 9,101,012 B2 | 8/2015 | Yu et al. | |
| 2006/0193131 A1 | 8/2006 | McGrath et al. | |
| 2006/0221606 A1 | 10/2006 | Dowling | |
| 2010/0091807 A1 | 4/2010 | Deppe et al. | |
| 2011/0133658 A1* | 6/2011 | Sauerlaender | H05B 33/0824 |
| | | | 315/192 |
| 2011/0181194 A1 | 7/2011 | Hum et al. | |
| 2012/0161666 A1 | 6/2012 | Antony et al. | |
| 2012/0229040 A1* | 9/2012 | Brown | H05B 33/0824 |
| | | | 315/200 R |
| 2012/0320627 A1 | 12/2012 | Araki et al. | |
| 2013/0049618 A1 | 2/2013 | Radermacher | |
| 2013/0127350 A1* | 5/2013 | Frias, Sr. | H05B 33/0806 |
| | | | 315/191 |
| 2013/0147350 A1* | 6/2013 | Yang | F21V 25/00 |
| | | | 315/52 |
| 2013/0200812 A1 | 8/2013 | Radermacher et al. | |
| 2013/0241443 A1 | 9/2013 | Özgüc et al. | |
| 2013/0342119 A1* | 12/2013 | Malboeuf Joset | H05B 33/0809 |
| | | | 315/193 |
| 2014/0021871 A1* | 1/2014 | Loef | H05B 33/0809 |
| | | | 315/186 |
| 2014/0084800 A1 | 3/2014 | Lee | |
| 2014/0152184 A1 | 6/2014 | Tomiyama et al. | |
| 2014/0159592 A1* | 6/2014 | Pan | F21K 9/17 |
| | | | 315/187 |
| 2014/0203717 A1 | 7/2014 | Zhang | |
| 2014/0225519 A1* | 8/2014 | Yu | H05B 33/0809 |
| | | | 315/187 |
| 2014/0239834 A1 | 8/2014 | Choi et al. | |
| 2014/0362071 A1* | 12/2014 | Jung | H05B 33/0824 |
| | | | 345/212 |
| 2015/0048746 A1 | 2/2015 | Park | |

FOREIGN PATENT DOCUMENTS

| | | | | |
|---|---|---|---|---|
| CN | 202261914 U | | 5/2012 | |
| CN | 102769975 A | | 11/2012 | |
| CN | 103687176 A | | 3/2014 | |
| EP | 1502483 B1 | | 12/2008 | |
| EP | 2381159 A2 | | 10/2011 | |
| EP | 2503235 A1 | | 9/2012 | |
| EP | 2602544 A1 | | 6/2013 | |
| EP | 2630843 B1 | | 12/2014 | |
| EP | 2630842 B1 | | 3/2015 | |
| GB | 2447257 A | | 9/2008 | |
| GB | 2489513 A | | 10/2012 | |
| TW | 102203021 | * | 6/2013 | ......... H05B 33/0809 |
| TW | M455820 U1 | | 6/2013 | |
| WO | 2011053708 A1 | | 5/2011 | |
| WO | 2012025626 A1 | | 3/2012 | |
| WO | 2012131573 A1 | | 10/2012 | |
| WO | WO2012/139691 A1 | | 10/2012 | |
| WO | 2014115010 A1 | | 7/2014 | |
| WO | 2015028526 A1 | | 3/2015 | |

OTHER PUBLICATIONS

International Search Report and Written Opinion for PCT/EP2014/070568 issued on Feb. 25, 2015.
Dutch Search Report for priority document NL2014525 issued on Jan. 20, 2016.

* cited by examiner

LED LAMP WITH BALLAST DETECTION AND METHOD THEREOF

CROSS REFERENCE TO RELATED APPLICATIONS

This application is a continuation-in-part of PCT application number PCT/EP2014/070568 filed on Sep. 25, 2014, which claims priority from Netherlands application number 2011495 filed on Sep. 25, 2013. Both applications are hereby incorporated by reference in their entireties.

BACKGROUND OF THE INVENTION

1. Field of the Invention

The invention relates generally to LED lamps and LED lighting, and more particularly to LED lamps suitable to replace a fluorescent lamp in a luminaire having a ballast for use with fluorescent lamps.

2. Description of the Related Art

Fluorescent lighting has been around for many years now. This form of lighting started out as a highly efficient alternative for incandescent light bulbs, but has recently been surpassed by LED lighting to some extent in terms of efficiency and power consumption, and also in other aspects as set out below.

Fluorescent lamps generally comprise a tube filled with an inert gas and a small amount of mercury, capped at both ends with double pinned end caps. The end caps contain a glow wire to preheat the gasses inside the tube and to vaporize the mercury in order to assist with ignition of the fluorescent lamp. Once the fluorescent lamp is ignited, heat generated by the conducted current keeps the fluorescent lamp in operational condition. To facilitate these starting conditions and to limit current through the fluorescent lamp during operation, and thus limit the power consumed, an electrical ballast is connected between the mains power supply and the fluorescent lamp and power is supplied to the lamp via the ballast.

When first introduced, the only available ballasts were simple inductive elements placed in series with the power supply to the fluorescent lamp, which limit consumed power by limiting the AC current as a result of the frequency dependent impedance of the inductor. An undesirable result is a relatively low power factor and relatively high reactive power. These types of ballasts are usually referred to as magnetic ballasts More recently electronic ballasts have been introduced. Such electronic ballasts usually first convert AC mains power into DC power, and subsequently convert the DC power into high frequency AC power to drive the fluorescent lamp. The more recent electronic ballasts actively control current through the fluorescent lamp and actively control AC power absorbed by the ballast itself. This allows the system to have a power factor close to a value of one. Even though power absorbed by the electronic ballast and fluorescent lamp combined is only slightly lower than a system with a magnetic ballast, reactive power is greatly reduced. The efficiency of the ballast itself is also improved.

Although LED lighting itself is only slightly more efficient than fluorescent lighting, it has many other advantages. For example, no mercury is required for LED lighting, LED lighting is more directional, LEDs require less effort to control or regulate power consumed, and the lifetime is greatly increased over fluorescent lighting.

Thus, replacing existing fluorescent lighting systems with LED lighting systems is often desirable. However, costs for such replacement are relatively high. Replacement LED lamps which lack appropriate circuits to deal with the ballast cannot be inserted in luminaires designed for fluorescent lamps due to the ballast, so the existing luminaire for fluorescent lamps needs to be replaced. As a consequence, many users simply replace failed fluorescent lamps with another fluorescent lamp, even in view of the evident advantages of LED lamps. The incentive to replace fluorescent lamps with LED lamps is further diminished when only a single fluorescent tube in a multi-tube luminaire has failed. Replacing the luminaire would result in discarding fluorescent tubes still in functioning order.

Consequently, there is a need for an LED lamp that can be put into operation when mounted in an existing luminaire designed for a fluorescent lamp.

Currently, there are LED lamps on the market shaped like fluorescent tubes that can be placed in an existing luminaire. However, these LED lamps require the luminaire to be stripped of the ballast and re-wired to directly connect the LED lamp to a mains power supply without intervention of a ballast. The labour required for the stripping and re-wiring the luminaire negates much, if not all, of the savings involved in switching to LED lighting, or even presents higher costs.

Consequently, a replacement lamp that does not require modification of the luminaire is preferred. Previously the design of LED lamps would have to be modified in terms of electronics to allow the new LED lamps to be inserted in the lamp holders of an existing fluorescent luminaire and subjected to the influence of a magnetic or electronics ballast, even when it is often unknown in advance whether a luminaire comprises an older magnetic inductor based ballast or a more modern electronics based ballast.

Examples of possible configurations are shown in FIG. 1 for a magnetic ballast 5 and in FIG. 2 for an electronic ballast 6, connected to mains power supply 7. The LED lamp 1 comprises LEDs 2 and an LED driver circuit 3, as well as safety devices 4 to secure proper functioning of the LED driver. Such safety devices 4 ensure that prior fluorescent lamps are connected on both sides to a combination of the ballast 5, 6 and mains power 7, before circuits are actually established for lighting the fluorescent lamp.

This approach entails a two-stage conversion of the power to (at least approximately) again obtain mains power supply for the LEDs 2. The first conversion is performed by the ballast 5 or 6 and the second conversion is performed by the internal LED driver 3 in the LED lamp 1. With respect to regulating power to the LEDs, a conversion step or stage by the LED driver 3 in the LED lamp 1 should be at least approximately inverse to the transfer characteristics of the ballast 5 or 6, requiring two operating modes of the LED driver 3 for an electronic ballast as the precise type of ballast (a magnetic inductor based ballast or electronic ballast) is normally not known when inserting a LED lamp 1 into an existing luminaire.

It is highly desired to be able to manufacture a single type of LED lamp, and not several types to comply with the type of ballast, which would also avoid the problem of having to determine the type of ballast before purchasing a replacement LED lamp of the required type. The preferably uniform LED driver 3 of FIGS. 1 and 2 would be required to detect the type of ballast actually arranged in the luminaire and operate differently for different types of ballast, adding to the complexity, cost and inefficiency of the resulting configuration, at least in terms of manufacture, in order to provide this selection in dependence of the type of ballast.

The present invention addresses the above problems.

BRIEF SUMMARY OF THE INVENTION

A first aspect of the invention comprises an LED lamp arrangement adapted to replace a fluorescent lamp in a luminaire having a ballast for supplying power to the lamp. The LED lamp arrangement comprises a plurality of LEDs arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration. The LED lamp arrangement further comprises first circuit adapted to generate an output indicating whether the ballast is a magnetic ballast or a non-magnetic ballast (e.g. an electronic ballast), and second circuit adapted to change a connection of the plurality of groups of LEDs between the first circuit configuration and the second circuit configuration on the basis of the output of the first circuit. The LED lamp arrangement preferably generates a luminous flux at least 200 lumens, or the LED dies for the LEDs each have a luminous flux of at least 1 lumen, or the LED lamp arrangement generates a luminous flux at least 200 lumens and the LED dies for the LEDs each have a luminous flux of at least 1 lumen.

The groups of LEDs may be arranged into a plurality of groups of LEDs. The groups of LEDs preferably each comprise a plurality of LEDs, and preferably all contain the same number of LEDs of the same type, but the groups may also differ.

The first and second circuit configurations differ in the manner in which the groups of LEDs are connected together to form a string of LEDs. The first circuit configuration may correspond with all of the groups of LEDs being connected in series, e.g. across the power supply lines of the LED lamp arrangement, and the second circuit configuration may correspond to all of the groups of LEDs being connected in parallel to each other. For example, the LEDS may be arranged in three groups, and the second circuit may comprise two switches which are arranged to switch the three groups between a circuit configuration having all three groups of LEDs connected in series and a circuit configuration having all three groups of LEDs connected in parallel with each other.

Alternatively, the first and second circuit configurations may differ in the number of the groups of LEDs connected in series versus the number of groups connected in parallel. The first circuit configuration may comprise a greater number of the LEDs connected in a series string than the second circuit configuration. In one embodiment, the first circuit configuration corresponds to a series connection of all of the groups of LEDs, i.e. all of the groups are connected together in a series circuit. The second circuit may be adapted to connect the plurality of groups of LEDs into the first circuit configuration when the output from the first circuit indicates the ballast is a magnetic ballast. Thus, when the LED lamp arrangement is supplied with power by a magnetic ballast, the groups of LEDs may be connected together in a series circuit, leading to a higher voltage drop across the complete LED string of the lamp.

The first and second circuit configurations may also or alternatively differ in the number of the groups of LEDs connected across the power supply lines of the arrangement versus the number of the groups of LEDs which are bypassed or disconnected.

The LEDs may be arranged in the first circuit configuration in the absence of power supplied to the LED lamp arrangement. In this way, the first circuit configuration may be a default configuration, e.g. a series configuration suitable for use with a luminaire having a magnetic ballast. If the LED lamp arrangement is placed into a luminaire with e.g. a magnetic ballast, then the arrangement may be adapted to remain in the default configuration. If the arrangement is placed into a luminaire with a different type of ballast, e.g. an electronic ballast, then the arrangement may be adapted to switch to the second circuit configuration.

In one embodiment, the second circuit configuration corresponds to a parallel connection of at least a portion of the groups of LEDs. The second circuit may be adapted to connect the plurality of groups of LEDs into the second circuit configuration when the output from the first circuit indicates the ballast is a non-magnetic ballast, e.g. an electronic ballast. Thus, when the LED lamp arrangement is supplied with power by a non-magnetic ballast (e.g. an electronic ballast), the groups of LEDs may be connected together so that some or all of the groups of LEDs are connected in parallel with each other, leading to a lower voltage drop across the complete LED string of the lamp, i.e. lower than for the first circuit configuration.

The second circuit may be adapted to connect the plurality of groups of LEDs into the first circuit configuration in which the plurality of groups of LEDs are connected in series when the output from the first circuit indicates the ballast is a magnetic ballast, and into the second circuit configuration in which at least a portion of the groups of LEDs are connected in parallel when the output from the first circuit indicates the ballast is a non-magnetic ballast, e.g. an electronic ballast.

The LED lamp arrangement may be configured so that, during operation, a voltage drop across the first circuit configuration is higher than a voltage drop across the second circuit configuration.

The first circuit may comprise one or more of: (a) a sensing circuit adapted to sense a frequency of power supplied to the LED lamp arrangement, the first circuit generating its output on the basis of the sensed frequency; (b) a sensing circuit adapted to sense harmonic content of voltage or current supplied to the LED lamp arrangement, the first circuit generating its output on the basis of the sensed harmonic content; (c) a sensing circuit adapted to sense rate of change of voltage or current supplied to the LED lamp arrangement, the first circuit generating its output on the basis of the sensed rate of change; (d) a sensing circuit adapted to sense output impedance of the ballast, the first circuit generating its output on the basis of the sensed output impedance; (e) a sensing circuit adapted to sense amplitude of current or voltage supplied to the LED lamp arrangement, the first and second circuit cooperating to sense current or voltage when the arrangement is connected one of the first or the second circuit configurations, the first circuit generating its output on the basis of the sensed amplitude.

The first circuit and the second circuit may be adapted to connect the plurality of groups of LEDs in the second circuit configuration if the sensed frequency is within a certain predetermined frequency range. The predetermined frequency range corresponds to a frequency range output from one of a magnetic ballast or an electronic ballast.

When the first circuit comprises a sensing circuit adapted to sense a frequency of power supplied to the LED lamp arrangement, the first and second circuit may be adapted to connect the plurality of LEDs in the first circuit configuration if the sensed frequency is within a first predetermined frequency range, and to connect the plurality of LEDs in the second circuit configuration if the sensed frequency is within a second predetermined frequency range different from the first predetermined frequency range. The first predetermined frequency range may correspond to a frequency range output from a magnetic ballast and the second predetermined frequency range corresponds to a frequency range output from an electronic ballast. The sensing circuit for sensing a frequency of power supplied to the arrangement may comprise a filter, e.g. an RC network or active filter, or other circuit for discriminating between different frequencies.

The second circuit may comprise a single switch such as a transistor or multiple transistors (arranged e.g. as a Darlington pair), a mechanical or electromechanical switch, or equivalent, and may comprise a plurality of switches.

The plurality of LEDs, the first circuit and the second circuit may be arranged in a single integral housing in a configuration suitable to replace a fluorescent lamp in a luminaire, i.e. in a configuration having a size, shape and terminal positions which allow the LED lamp arrangement to fit into a luminaire designed for a fluorescent tube. The housing may be tubular in shape, conforming generally to the shape of a conventional fluorescent tube. Alternatively, the LEDs, the first circuit and the second circuit may be arranged in one or more separate housings which fit together to form a configuration suitable to replace a fluorescent lamp in a luminaire.

In operation, the LED lamp arrangement may be designed or adapted to generate a power output of the plurality of LEDs in the first circuit configuration used with one of a magnetic or electronic ballast which is substantially equivalent to a power output of the plurality of LEDs in the second circuit configuration used with the other of a magnetic or electronic ballast. The LED lamp arrangement may be designed so that, in operation in a luminaire, the light flux level produced by the plurality of LEDs connected in one of the first or second circuit configurations used with a magnetic ballast is substantially equivalent to the light flux level produced by a fluorescent tube used with the magnetic ballast. This enables the LED lamp arrangement to provide approximately the same light output from the LEDs in both the first and second configuration, i.e. regardless of the type of ballast fitted in the luminaire.

In a luminaire, the light flux level produced by the plurality of LEDs configured in one of the first or second circuit configurations used with a magnetic ballast is preferably substantially equivalent to the light flux level produced by a fluorescent tube used with said magnetic ballast. The arrangement thus is preferably designed to provide approximately the same light output from the LEDs as a conventional fluorescent tube when placed in a luminaire fitted with a magnetic ballast. The arrangement may also be designed to provide approximately the same light output from the LEDs as a conventional fluorescent tube when placed in a luminaire fitted with an electronic ballast.

In a second aspect of the invention, the LED lamp arrangement may optionally further include a third circuit or circuit for sensing a condition indicating that current through at least a portion of the plurality of LEDs is below a threshold, and generating an output, and a fourth circuit or circuit for switching the circuit configuration of the plurality of LEDs on the basis of the output of the third circuit.

The fourth circuit for switching the circuit configuration may be adapted to switch between the first circuit configuration and another circuit configuration, or between the second circuit configuration and another circuit configuration, at a certain duty cycle. The fourth circuit for switching the circuit configuration may be designed to switch between different circuit configurations with a certain duty cycle, e.g. during each cycle of the power supply voltage. For example, the duty cycle may comprise switching to the first circuit configuration for a first portion of a cycle of the power supply voltage and switching to another different circuit configuration for a remaining portion of the cycle of the power supply voltage. In this example, the other circuit configuration could be the second circuit configuration, or it could be a third circuit configuration which is different from both the first and second circuit configurations. The third and fourth circuit may be designed to make use of the inductance of a magnetic ballast fitted in the luminaire for switching the circuit configuration, since the inductance of the magnetic ballast acts to shorten the time period of zero or nearly zero current through the LEDs. As a result, a separate inductance may be omitted from the circuits, or a smaller inductance may be used than would otherwise be required.

The duty cycle may be selected to reduce a difference between a power output of the plurality of LEDs in the first and second circuit configurations. For example, the light output when in the second circuit configuration can be adjusted by switching between the second circuit configuration and another (third) circuit configuration at a certain duty cycle, which is selected to achieve light output closer to that of the first circuit configuration. In this way, the arrangement can output the same of similar amount of light regardless of the type of ballast, e.g. magnetic or electronic, which is fitted in the luminaire.

The fourth circuit for switching the circuit configuration may also or additionally be adapted to switch between the circuit configurations at a duty cycle which is determined at least in part on the basis of the output of the first circuit. In this way, switching between circuit configurations at a certain duty cycle may be adjusted, additionally or alternatively, in dependence on the type of ballast, e.g. magnetic or electronic, which is fitted in the luminaire. For example, the duty cycle used with one type of ballast, e.g. a magnetic ballast, may be different from the duty cycle when the arrangement is used with another type of ballast, e.g. an electronic ballast. The type of ballast may be determined e.g. by an output of the first circuit for sensing a frequency of power supplied to the arrangement of the first aspect of the invention.

The fourth circuit for sensing a condition when current through at least a portion of the plurality of LEDs is below a threshold may be adapted to measure current flowing through at least a portion of the plurality of LEDs, to measure voltage applied to at least a portion of the plurality of LEDs, and/or to measure phase of a voltage applied to at least a portion of the plurality of LEDs. The fourth circuit may thus use different measurements to detect the condition of low current through the LEDs.

The fourth circuit for switching the circuit configuration may be constructed similarly to the second circuit of the first aspect of the invention, and the second circuit and the fourth circuit may be embodied at least in part in the same circuit element or elements. In this way, the second and fourth circuit can use some or all of the same circuit elements to reduce the number of components required. For example, the same one or more transistors switches which constitute the second circuit may also constitute the fourth circuit.

The third circuit for sensing a condition when current through at least a portion of the plurality of LEDs is below a threshold may be configured for activating the fourth circuit for switching the circuit configuration of the plurality of LEDs during at least a portion of the time period when current through at least a portion of the plurality of LEDs is substantially zero. In this way, the circuit configuration may be changed during the part of the power supply cycle when current through the LEDs is zero or nearly zero, i.e. around the zero crossing point of the power supply voltage.

Note that it is also possible that the LED lamp arrangement of the second aspect of the invention may also be applied in an arrangement which omits the first circuit and second circuit of the first aspect of the invention.

A third aspect of the invention comprises a control circuit adapted for operation in a luminaire having a ballast for supplying power to an LED lamp arrangement. The LED lamp arrangement comprises a plurality of LEDs arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration. The control circuit comprises first circuit adapted to generate an output indicating whether the ballast is a magnetic ballast or a non-magnetic ballast, and second circuit adapted to change a connection of the plurality of groups of LEDs of the LED lamp arrangement between the first circuit configuration and the second circuit configuration on the basis of the output of the first circuit. The control circuit of the third aspect of the invention corresponds to the combination of the first circuit and the second circuit of the LED lamp arrangement described above and in detail below, and may comprise any or all of the features described herein. Thus, the third aspect of the invention contemplates a control circuit for use with a suitable LED lamp having groups of LEDs switchable between different circuit configurations.

A fourth aspect of the invention comprises a luminaire adapted for using one or more fluorescent lamps, the luminaire comprising one or more magnetic or electronic ballasts suitable for energizing the fluorescent lamps, wherein the luminaire is fitted with one or more LED lamp arrangements as described herein in place of the one or more fluorescent lamps.

A fifth aspect of the invention provides a method of operating an LED lamp arrangement adapted to replace a fluorescent lamp in a luminaire having a ballast for supplying power to the lamp. The LED lamp arrangement comprises a plurality of LEDs arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration. The LED lamp arrangement preferably generates a luminous flux at least 200 lumens and/or the LED dies for the LEDs each have a luminous flux of at least 1 lumen. The method comprises generating an output signal indicating whether the ballast is a magnetic ballast or a non-magnetic ballast, and changing a connection of the plurality of groups of LEDs between the first circuit configuration and the second circuit configuration on the basis of the output signal.

The first circuit configuration may comprise a greater number of the LEDs connected in a series string than the second circuit configuration. The first circuit configuration corresponds to a series connection of all of the groups of LEDs. Changing a connection of the plurality of groups of LEDs may comprise connecting the plurality of groups of LEDs into the first circuit configuration when the output from the output signal indicates the ballast is a magnetic ballast.

The second circuit configuration may correspond to a parallel connection of at least a portion of the groups of LEDs, and changing a connection of the plurality of groups of LEDs may comprise connecting the plurality of groups of LEDs into the second circuit configuration when the output signal indicates the ballast is a non-magnetic ballast. Changing a connection of the plurality of groups of LEDs may comprise connecting the plurality of groups of LEDs into the first circuit configuration in which the plurality of groups of LEDs are connected in series when the output signal indicates the ballast is a magnetic ballast, and into the second circuit configuration in which at least a portion of the groups of LEDs are connected in parallel when the output signal indicates the ballast is a non-magnetic ballast. A voltage drop across the first circuit configuration may be higher than a voltage drop across the second circuit configuration.

Generating the output signal may comprise one or more of: (a) sensing a frequency of power supplied to the LED lamp arrangement, and generating the output indicating whether the ballast is a magnetic ballast or a non-magnetic ballast on the basis of the sensed frequency; (b) sensing harmonic content of voltage or current supplied to the LED lamp arrangement, and generating the output indicating whether the ballast is a magnetic ballast or a non-magnetic ballast on the basis of the sensed harmonic content; (c) sensing rate of change of voltage or current supplied to the LED lamp arrangement, and generating the output indicating whether the ballast is a magnetic ballast or a non-magnetic ballast on the basis of the sensed rate of change; (d) sensing output impedance of the ballast supplying power to the LED lamp arrangement, and generating the output indicating whether the ballast is a magnetic ballast or a non-magnetic ballast on the basis of the sensed output impedance; (e) sensing an amplitude of current or voltage supplied to the LED lamp arrangement when the LED lamp arrangement is connected in one of the first circuit configuration or the second circuit configuration, and generating the output indicating whether the ballast is a magnetic ballast or a non-magnetic ballast on the basis of the sensed amplitude.

The method may comprise sensing a frequency of power supplied to the LED lamp arrangement, and connecting the plurality of groups of LEDs in the second circuit configuration if the sensed frequency is within a certain predetermined frequency range. The predetermined frequency range may correspond to a frequency range output from one of a magnetic ballast or an electronic ballast. The method may comprise connecting the plurality of LEDs in the first circuit configuration if the sensed frequency is within a first predetermined frequency range, and connecting the plurality of LEDs in the second circuit configuration if the sensed frequency is within a second predetermined frequency range different from the first predetermined frequency range. The first predetermined frequency range may correspond to a frequency range output from a magnetic ballast and the second predetermined frequency range may correspond to a frequency range output from an electronic ballast.

The same features and considerations described herein for the first to fourth aspects of the invention also apply for the methods described herein.

The method may further comprise arranging the first and second circuit configurations so that a power output of the plurality of LEDs when operating in the first circuit configuration with one of a magnetic or electronic ballast, is substantially equivalent to a power output of the plurality of LEDs when operating in the second circuit configuration with the other of a magnetic or electronic ballast.

The method may further comprise arranging the first and second circuit configurations so that a light flux level produced by the plurality of LEDs configured in one of the first or second circuit configurations used with a magnetic ballast is substantially equivalent to the light flux level produced by a fluorescent tube used with said magnetic ballast.

The method may further comprise sensing a condition indicating that current through at least a portion of the plurality of LEDs is below a threshold and generating an output; and switching the circuit configuration of the plurality of LEDs on the basis of the output.

The step of switching the circuit configuration may comprise switching between the first circuit configuration and another circuit configuration, or between the second circuit configuration and another circuit configuration, at a duty cycle. The duty cycle may be selected to reduce a difference between a power output of the plurality of LEDs in the first and second circuit configurations. Switching the circuit configuration may additionally or alternatively comprise switching between the circuit configurations at a duty cycle which is determined at least in part on the basis of the output of the first circuit for sensing frequency.

The method may also comprise switching the circuit configuration of the plurality of LEDs during at least a portion of the time period when current through at least a portion of the plurality of LEDs is substantially zero.

The method may further comprise sensing a condition indicating that current through at least a portion of the plurality of LEDs is above a first threshold or below a second threshold, storing in an energy storage circuit at least part of electrical energy provided to the arrangement, when current through at least a portion of the plurality of LEDs is above the first threshold, and releasing previously stored energy when current through at least a portion of the plurality of LEDs is below the second threshold. Releasing the previously stored energy may comprise supplying only a part of the energy stored in the energy storage circuit to at least a portion of the plurality of the LEDs.

The method may further comprise sensing a frequency of power supplied to the arrangement by the luminaire, providing a variable impedance connected across two input power connection lines of the arrangement, and varying the variable impedance on the basis of the sensed frequency.

The method may further comprise increasing the impedance of the variable impedance if the sensed frequency is within a certain predetermined frequency range. The predetermined frequency range may correspond to a frequency range output from one of a magnetic ballast or an electronic ballast. The method may further comprise increasing the impedance of the variable impedance to an impedance sufficient such that a starter element present in the luminaire is not activated when a magnetic ballast is used for supplying power to the arrangement.

In a fourth aspect of the invention, may optionally further include a fifth circuit for sensing a condition indicating that current through at least a portion of the plurality of LEDs is above a first threshold or below a second threshold, and energy storage circuit for storing at least part of electrical energy provided to the arrangement, where the energy storage circuit is adapted to store additional energy when the output of the fifth circuit indicates that current through at least a portion of the plurality of LEDs is above the first threshold, and to release previously stored energy when the output of the fifth circuit indicates that current through at least a portion of the plurality of LEDs is below the second threshold. In this way, the energy may be stored in the energy storage circuit during peaks in the power supply cycle (e.g. when current through the LEDs is above the first threshold) and energy previously stored in the energy storage circuit may be released so that it flows through the LEDs during valleys in the power cycle (e.g. when current through the LEDs is below the second threshold).

The arrangement may be configured for supplying only a part of the energy stored in the energy storage circuit to at least a portion of the plurality of the LEDs. Releasing only a portion of the stored energy leads to more efficient operation of the energy storage circuit.

The fifth circuit for sensing a condition indicating that current through at least a portion of the plurality of LEDs is above a first threshold or below a second threshold may be constructed similarly to the third circuit of the first aspect of the invention, and the third circuit and the fifth circuit may be embodied at least in part in the same circuit element or elements. In this way, the third and fifth circuit can use some or all of the same circuit elements to reduce the number of components required.

In a fifth aspect of the invention, the arrangement may optionally further include a sixth circuit or circuit for sensing a frequency of power supplied to the arrangement by the luminaire, and generating an output, and a variable impedance connected across two input power connection lines of the arrangement, the variable impedance providing an impedance which varies in accordance with the output of the fifth circuit for sensing a frequency. As described above, sensing the frequency of power supplied to the arrangement may discriminate between a magnetic or electronic ballast, and so the variable impedance may be varied in dependence on the type of ballast fitted to the luminaire.

The sixth circuit for sensing a frequency and the variable impedance may be adapted to increase the impedance of the variable impedance if the sensed frequency is within a certain predetermined frequency range. The predetermined frequency range may correspond to a frequency range output from one of a magnetic ballast or an electronic ballast.

The sixth circuit for sensing a frequency may be constructed similarly to the first circuit of the first aspect of the invention, and the first circuit for sensing a frequency and the sixth circuit for sensing a frequency may be embodied at least in part in the same circuit element or elements. In this way, the first and sixth circuit can use some or all of the same circuit elements to reduce the number of components required.

The variable impedance may comprise an impedance and a switch for connecting or disconnecting the impedance across the two input power connection lines of the arrangement. The variable impedance may alternatively comprise a first impedance, a second impedance, and a switch for connecting one of the first impedance or the second impedance across the two input power connection lines of the arrangement.

The arrangement may comprise two conducting pins located at one end of a housing and adapted for connection to the luminaire, the pins connected to the two input power connection lines of the arrangement, wherein the variable impedance is connected between the conducting pins.

The variable impedance may be adapted to increase in impedance when the output of the sixth circuit for sensing a frequency is indicative of operation with a magnetic ballast. The variable impedance may be adapted to increase in impedance to an impedance sufficient such that a starter element present in the luminaire is not activated when a magnetic ballast is used for supplying power to the arrangement.

BRIEF DESCRIPTION OF THE DRAWINGS

The following is a description of certain considerations, aspects and embodiments of the invention, referring to the appended drawings, in which the same or similar elements, components and aspects are designated with the same reference numbers, and which are only provided by way of example and should not be interpreted to limit embodiments under the present invention in any way. In the drawings.

DESCRIPTION OF ILLUSTRATIVE EMBODIMENTS

An explanation with respect to features of embodiments of the invention with respect to technical properties and phenomena is provided, followed by exemplary embodiments of the present invention.

Both magnetic and electronic ballasts are designed to start, control and to limit current supplied to a fluorescent tube and regulate the power consumed by the tube. Because of the electronic characteristics of LEDs, embodiments of the present invention are based on the surprising insight that both types of ballasts can be adapted to function as crude LED drivers, in which the total forward voltage of one or more strings or groups with a specific number of LEDs determines the actual consumed power.

An LED (light emitting diode) is a semiconductor light source, e.g. with a pn-junction which emits light when activated. When a suitable voltage is applied, electrons are able to recombine with electron holes within the device, releasing energy in the form of photons. This effect is called electroluminescence, and the colour of the light (corresponding to the energy of the photon) is determined by the energy band gap of the semiconductor. LEDs for lighting purposes are often combined with one or more phosphors to broaden or change the emitted spectrum of the LED device. The forward voltage of an LED is the voltage drop across the LED if the voltage at the anode of the LED is more positive than the voltage at the cathode of the LED. At a specific forward voltage, which can be approximated by connecting a specific number of LEDs with known characteristics in series, the LEDs will consume an equal or approximately equal amount of power as an equivalent fluorescent tube on the same ballast.

The LEDs can be arranged in a circuit forming a string of LEDs, and LEDs can be added to or removed from the string to vary the number of LEDs in the string and/or vary the number of LEDs connected in series or in parallel in the string. Thus, the total forward voltage of the LED string can be adjusted, thereby increasing or decreasing the power output.

Figure 1:
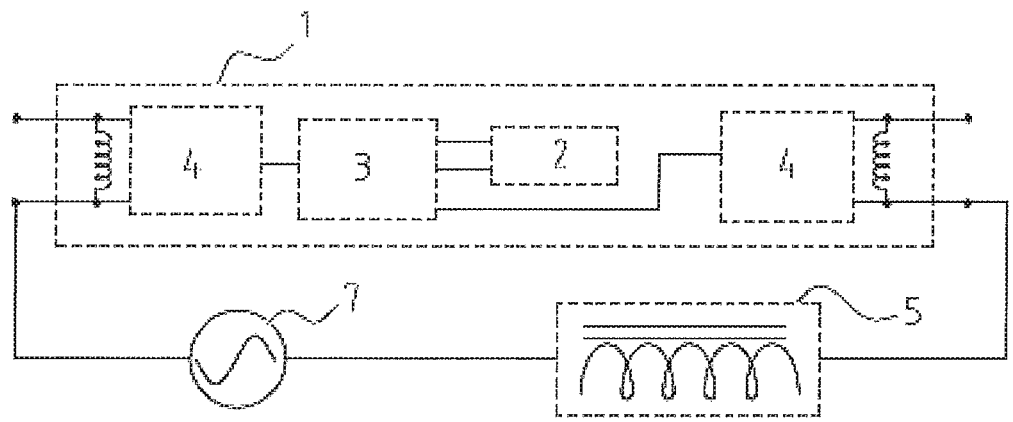
FIG. 1 shows a configuration for an arrangement in a luminaire having a magnetic inductor-based ballast.
Figure 2:
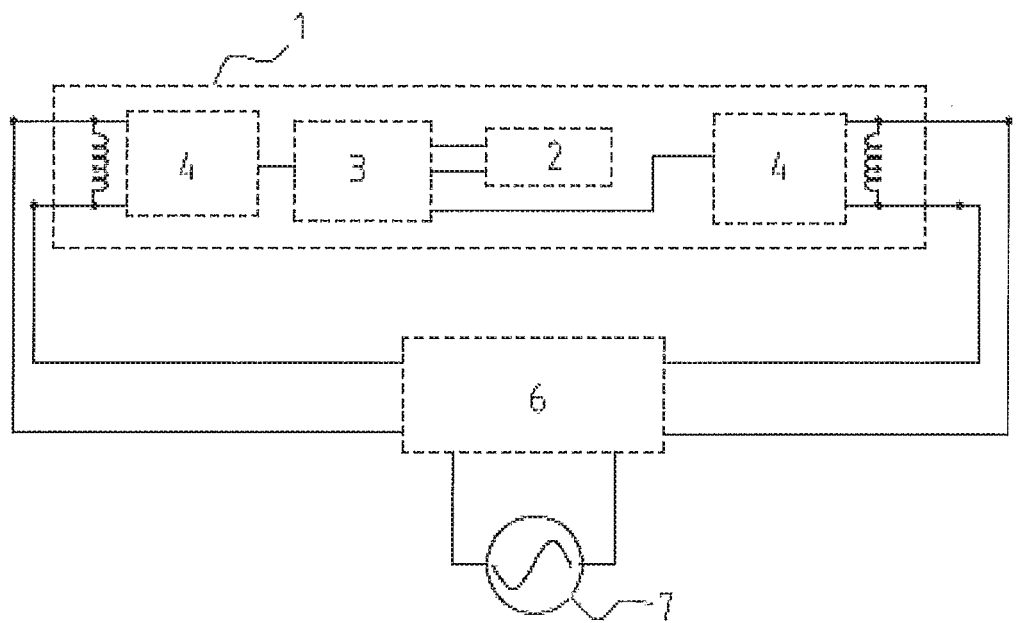
FIG. 2 shows a configuration for an arrangement in a luminaire having an electronic ballast.
Figure 3:
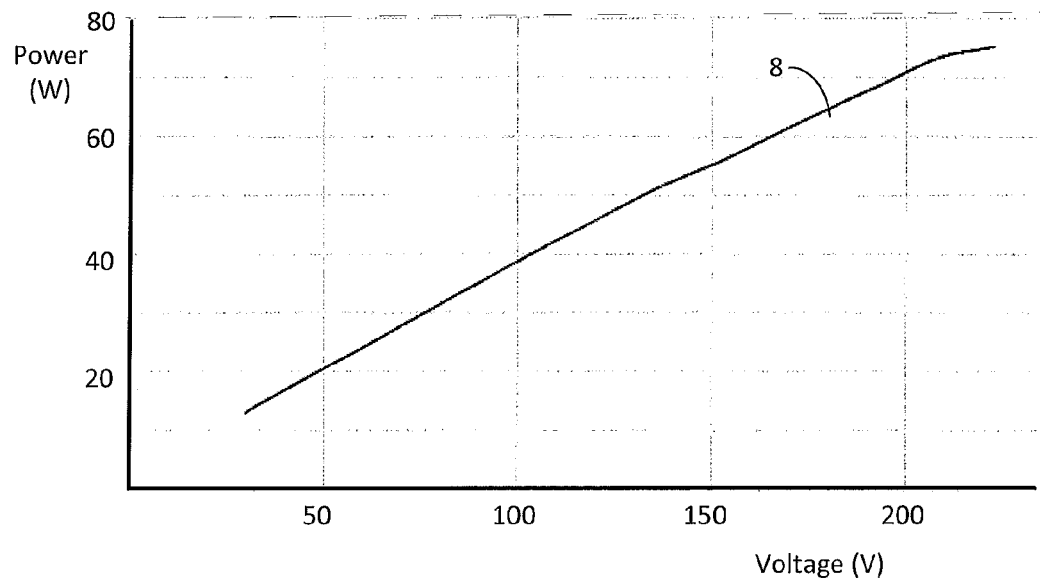
FIG. 3 shows a power characteristic with power along the vertical axis against voltage along the horizontal axis for an electronic ballast.

Magnetic and electronic ballasts can exhibit different behaviours with respect to different input power levels. FIG. 3 depicts a characteristic curve for a typical electronic ballast, with an approximately linear increase in power supplied by the ballast as output voltage is increased, demonstrating its applicability as current source. Note that electronic ballasts typically include over-power protection which automatically shifts down the current generated by the ballast once the power reaches a certain level.

Figure 4:
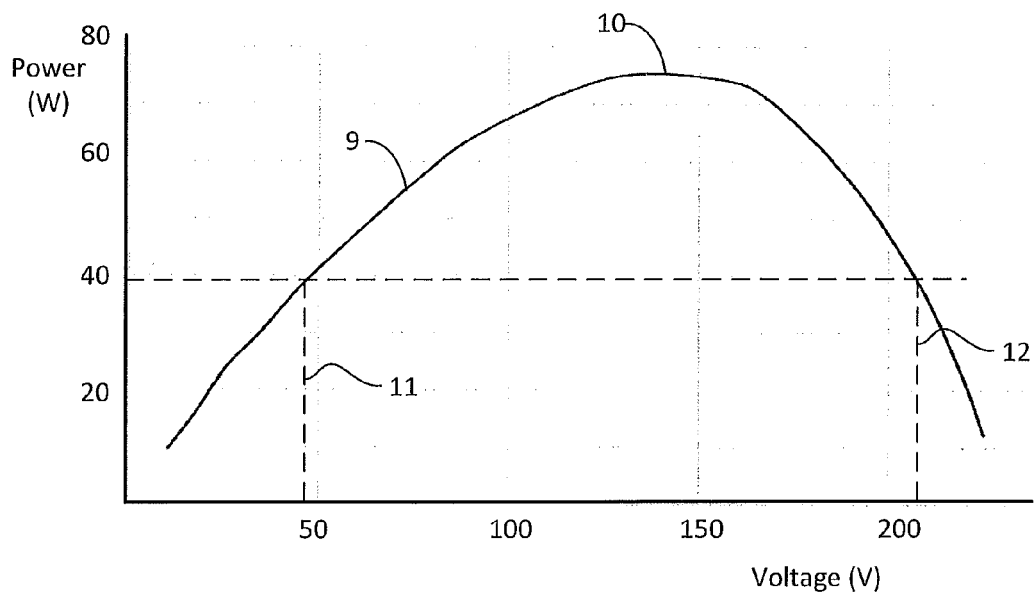
FIG. 4 shows a modelled power characteristic with power along the vertical axis against voltage along the horizontal axis for a magnetic inductor-based ballast.

FIG. 4 depicts a characteristic curve for a typical magnetic ballast (not including over-power protection). As shown in FIG. 4, power supplied by the ballast increases with output voltage to a maximum at point 10 and then decreases as voltage increases further. When the magnetic ballast is used to power a string of LEDs, an increase in the total forward voltage of the LED string relative to the situation at maximum point 10 will result in shifting the operating point to the right of maximum point 10 resulting in a decrease of power.

As can be seen in FIG. 4, the characteristic curve exhibits the same power output at two different voltages when operating at below the maximum 10. For example, a power output of 40 watts is achieved at operating voltages of approximately 50V and 210V, indicated at dashed lines 11 and 12 in FIG. 4. At these two voltages, the luminaire will operate at two different current levels and two different power factors, with substantially the same output power. At the higher voltage operating point, though, the reactive power is decreased significantly, and resistive losses in the coil and the connecting wiring, and the magnetization and saturation losses of the ballast core are therefore also decreased, so that the luminaire, at the above-mentioned output power, has a lower input power and as a result it operates more efficiently.

LEDs generally produce light (slightly) more efficiently than fluorescent tubes, and because LED lighting is directional the losses from redirecting light in the desired direction are lower, so that the required power for LED lighting is generally considerably lower than fluorescent lighting at the same light levels. However, efficiency can be significantly compromised when operating in the low voltage point, which may completely negate the power savings envisaged by the use of LED lighting.

By contrast, efficiency of the proposed arrangement according to an aspect of the invention is significantly higher at the higher voltage point identified by dashed line 12 in FIG. 4. As a consequence, the higher voltage configuration (with an operating point at a higher voltage level than the voltage level associated with maximum point 10 in FIG. 4) is preferred, at least for luminaires having a magnetic ballast. By contrast, electronic ballasts are generally configured for "(active) power factor correction", which entails the power factor is substantially constant irrespective of the input voltage operating point. Thus, in electronic ballasts the system efficiency is mainly determined by the efficiency of the conversion of the mains input power to the high frequency output power of the electronic ballast. Because of the active power factor correction, lowering the output power goes hand in hand with a decrease in input power, making operation of the system consume less power.

The consequence of the above considerations with respect to both magnetic ballasts and electronic ballasts is that the arrangement according to an embodiment of the present invention, which is preferably compatible with both electronic and magnetic ballasts, may be operated at two different voltage levels and at two different current levels, which can differ significantly, for the two types of ballasts (i.e. magnetic and electronic) that are usually arranged in a luminaire for use with a replaced fluorescent lamp.

An example of operating conditions is shown in the tables below.

TABLE 1.1 for fluorescent lamp

| Ballast type | Frequency (Hz) | Power (W) | Lamp voltage ($V_{RMS}$) | Lamp current ($mA_{RMS}$) |
| --- | --- | --- | --- | --- |
| Magnetic | 50 | 39 | 113 | 345 |
| Electronic | 25000 | 34 | 100 | 340 |

TABLE 1.2 for an exemplary embodiment of the invention

| Ballast type | Frequency (Hz) | Power (W) | Lamp voltage ($V_{RMS}$) | Lamp current ($mA_{RMS}$) |
| --- | --- | --- | --- | --- |
| Magnetic | 50 | 28 | 215 | 130 |
| Electronic | 25000 | 28 | 90 | 311 |

According to one embodiment, an arrangement is provided which is suitable for operation at the different voltage and current levels required by the different types of ballasts.

In embodiments of the invention, the different voltage and current levels for the respective types of magnetic and electronic ballasts are achieved by arranging a plurality of LEDs in a circuit configuration which can be changed in accordance with the type of ballast installed in the luminaire. The LEDs may be arranged in a string of LEDs and the power supply voltage from the ballast is imposed across the LED string. The LED string comprises multiple groups or substrings of LEDs which can be arranged in at least two different circuit configurations, each circuit configuration having at least a portion of the groups of LEDs connected into the circuit (i.e. the LED string) differently than in the other circuit configuration. Each group of LEDs will usually comprise a plurality of LEDs, the LEDs in a group being connected in series or parallel or a combination of both, and it is also possible to have one or more groups comprising a single LED.

The LED lamp arrangement may generate a luminous flux of at least 200 lumens, and preferably generates a much higher luminous flux of at least 600 lumens, 1800 lumens, or multiple thousands of lumens to be suitable for lighting applications in which fluorescent tubes are typically used, such as office lighting. The LEDs are formed on LED dies, and the LED dies may each generate a luminous flux of at least 1 lumen, and preferably generate a higher luminous flux so that the number of LEDs used in the LED lamp arrangement suitable for replacing a fluorescent tube is not excessive.

One possible implementation is to arrange the LEDs into multiple groups which are connected so that one or more of the groups can be arranged in series or in parallel to each other to vary the circuit configuration of the LED string. Another possibility is to bypass or short-circuit or disconnect one or more of the groups of LEDs to vary the circuit configuration of the LED string.

The circuit configuration of the LED string can be varied by including one or more switches to vary the connections between the groups of LEDs. The groups of LEDs may be switched independently (i.e. switching a group or LEDs into a configuration in series or parallel with other groups of LEDs, or bypassing, short-circuiting, or disconnecting a group of LEDs) or multiple groups may be switched simultaneously to achieve a co-ordinated change in circuit configuration of multiple groups of LEDs. For example, for an LED string comprising three groups of LEDs, the three groups may be switched between a series configuration in which the three groups of LEDs are connected in series across the power supply voltage, and a parallel configuration in which the three groups of LEDs are connected parallel to each other across the power supply voltage.

Figure 5:
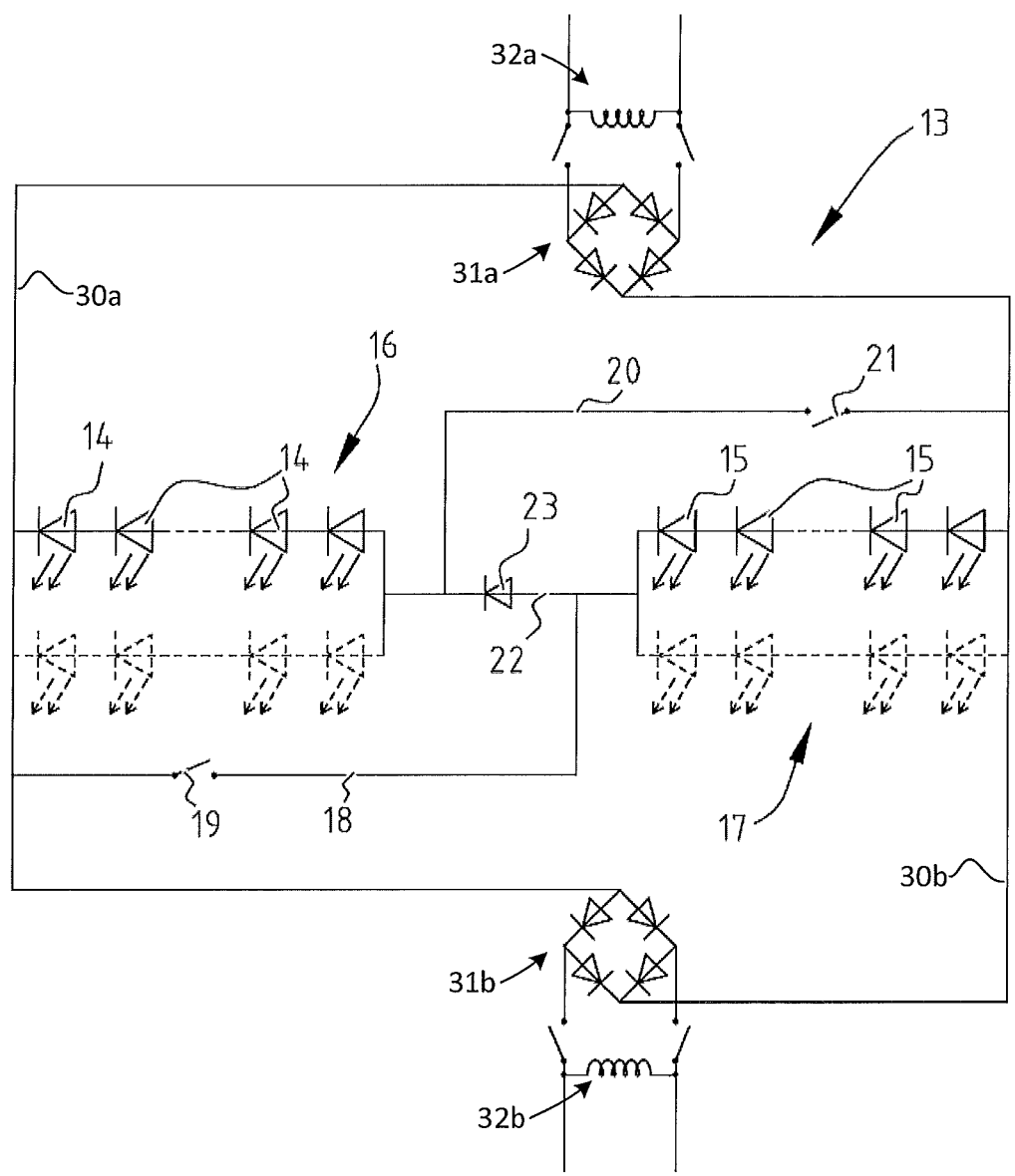
FIG. 5 shows a schematic representation of one embodiment of an LED lamp arrangement.

FIG. 5 shows a schematic representation of an exemplary LED lamp arrangement 13 comprising two full-wave rectifiers 31a, 31b and impedances 32a, 32b (which may be inductors, resistors or a combination thereof in different embodiments) and an LED string arranged across power supply lines 30a, 30b at the outputs of the rectifiers (safety switches are also shown between the rectifiers 31a, 31b and impedances 32a, 32b). The arrangement 13 may be fitted in a single housing having dimensions comparable to a conventional fluorescent tube and able to fit into a conventional fluorescent luminaire in place of a fluorescent tube.

The embodiment shown in FIG. 5 is a two-ended design with rectifier 31a located towards one end of the housing and rectifier 31b at the other end, adapted for receiving the mains power supply voltage across inputs of the two rectifiers. However, the arrangement 13 may also be adapted for one-ended operation receiving the mains power supply voltage across one of the rectifiers at one end of the housing.

The LED string comprises LEDs 14 arranged in a first group 16 and LEDs 15 arranged in a second group 17. Each of the groups 16, 17 includes a plurality of LEDs connected in series in a substring, and optionally a plurality of LEDs connected in series in a second substring which is connected in parallel with the first substring. The total number of LEDs in each group and the arrangement of the groups may be selected, in the below described manner, to have the resulting actual power consumed be equivalent to the power consumed by, for example, the fluorescent lamp to be replaced.

The arrangement 13 further comprises a first by-pass connection 18 with a first switch 19 connected in parallel to the first group 16 of LEDs and a connecting diode 23, and a second by-pass connection 20 with a second switch 21 connected in parallel to the second group 17 of LEDs and the connecting diode 23. The connecting diode 23 could be replaced in an alternative embodiment by a suitable controlled switch. The switches 19 and 21 are hereafter referred to as configuration switches, together forming a switching circuit, since they function to change the circuit configuration of the LED string.

The circuit configuration of the LED string can be changed by operating the configuration switches 19 and 21. LED groups 16 and 17 are connected in series (through diode 23) across the power supply lines 30a, 30b when configuration switches 19 and 21 are both open (i.e. not-conductive). LED groups 16 and 17 are connected in parallel across the power supply lines 30a, 30b when configuration switches 19 and 21 are both closed (i.e. conducting current). If switch 19 is closed and switch 21 is open, the second group 17 of LEDs is connected across the power supply lines 30a, 30b, while the first group 16 remains in series with the second group 17 and is effectively bypassed. If switch 19 is open and switch 21 is closed, the first group 16 of LEDs is connected across the power supply lines 30a, 30b, while the second group 17 remains in series with the first group 16 and is effectively bypassed.

Thus, four operating modes of the arrangement 13 are realized. In a preferred embodiment, by controlling the configuration switches 19, 21 so that they both exhibit the same state (e.g. both switches open or both switches closed) the switching control is facilitated while sufficient diversity of operation is achieved to allow the arrangement 13 to be adapted to magnetic or electronic ballasts.

Figure 7:
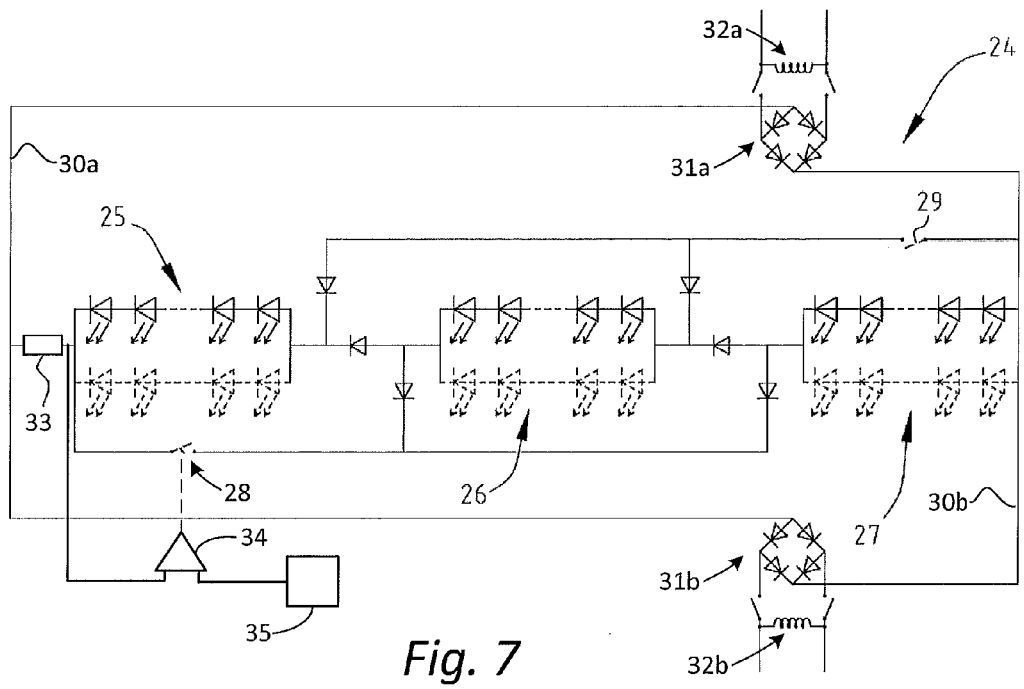
FIG. 7 shows a schematic representation of the embodiment of FIG. 6 and further including a line regulation circuit.

The switching circuit comprising configuration switches 19, 21 may be controlled to adjust the circuit configuration in dependence on the type of ballast used in the luminaire. This may be accomplished by providing a control circuit which detects the presence of a magnetic ballast, or an electronic ballast, or discriminates between the two types of ballast, and provides an output to control the switching circuit accordingly. For example, the control circuit may detect a characteristic of the ballast, for example by detecting frequency, harmonic content, or rate of change of the voltage or current output from the ballast, or measuring the output impedance of the ballast. One embodiment of the control circuit is shown in FIG. 7 and described below, although many other implementations may also be used as described herein.

In one embodiment, the control circuit provides an output to the switching circuit for connection of a greater number of the LEDs in a series string (i.e. in a first circuit configuration) when a magnetic ballast is detected by the control circuit then when a non-magnetic (e.g. electronic) ballast is detected by the control circuit. This first circuit configuration for a magnetic ballast may comprise, for example, a series connection of all of the groups (substrings) of LEDs. The control circuit provides a different output to the switching circuit when a non-magnetic ballast (e.g. an electronic ballast) is detected by the control circuit to trigger the switching circuit to switch to a different circuit configuration. For example, when a non-magnetic ballast is detected, the output form the control circuit may cause the switching circuit to make a parallel connection of at least a portion of the groups of LEDs (i.e. a second circuit configuration).

This may be achieved in the embodiment of FIG. 5 by opening both configuration switches 19 and 21 when the control circuit receives an input indicating a magnetic ballast is used, and closing both configuration switches 19 and 21 when the control circuit receives an input indicating a electronic ballast is used. This results in changing the circuit configuration of the LED string so that the two groups 16, 17 of LEDs are connected in series across the power supply lines 30a, 30b when a magnetic ballast is used, and the two groups 16, 17 of LEDs are connected in parallel across the power supply lines 30a, 30b when an electronic ballast is used. In this way, the forward voltage across the LED string in changed in dependence type of ballast used to drive the LED lamp arrangement.

The control circuit may use various methods to discriminate between a magnetic type ballast and a non-magnetic ballast, e.g. an electronic ballast. For example, the frequency of the voltage or current of the power supplied to the lamp from the ballast may be detected. Magnetic ballasts operate at mains frequencies, usually 50 or 60 Hz, and electronic ballasts operate at high frequencies, typically between 20 kHz and 50 kHz depending on the type and brand of ballast. This difference in operating frequency can be used to discriminate between the type of ballast. A frequency detection circuit may be used to provide a control signal used for switching the circuit configuration of the LED Groups. Any suitable circuit may be used which can generate an output in dependence on the frequency of the input, e.g. whether the frequency is above or below a threshold, or within a certain range. Such a circuit is described in more detail below.

The frequency of the ballast output may also be detected by measuring the frequency of variation in the amplitude of light emitted by the LEDs caused by the AC current flowing through the LEDs. For example, a circuit comprising a photodiode may be used to generate an output to discriminate between a magnetic or electronic ballast. The photodiode may be reversed biased and the reverse current through the photodiode monitored by a sensing resistor (e.g. a resistor in series with the photodiode). The frequency of the voltage across the sensing resistor can then be measured, e.g. by sampling using a microprocessor or microcontroller, and an output generated in dependence on the frequency.

Measurement of harmonics in the output current or voltage of the ballast may be used to differentiate a magnetic and electronic ballast. A magnetic ballast has very little or no harmonics in its output current or voltage, whereas an electronic ballast generates a quasi-sinewave output relatively high harmonic content, i.e. higher order frequencies above the fundamental frequency. In one implementation shown in FIG. 9, a circuit 40 comprising an analog-to-digital (A/D) converter 42 for converting the ballast output to a digital signal and a microcontroller 43 for performing a Fast Fourier Transform (FFT) of the signal. The circuit 40 may use a load 41 (e.g. a passive resistor or resistor network) which is switched across the output terminals of the ballast 5/6 for a brief period, e.g. a few seconds, to enable sampling of ballast output current to generate the digital signal. The FFT would generate a result indicative of the harmonic content at each order of frequency (both even and odd can be checked) and the microcontroller may use this to generate an output 44 indicating whether a magnetic or electronic ballast is present. A typical magnetic ballast will exhibit almost no measurable values for the harmonics up to the 13th order, whereas a typical electronic ballast will exhibit substantial values of harmonic content from the 3rd to 13th order of its operating frequency.

Figure 9:
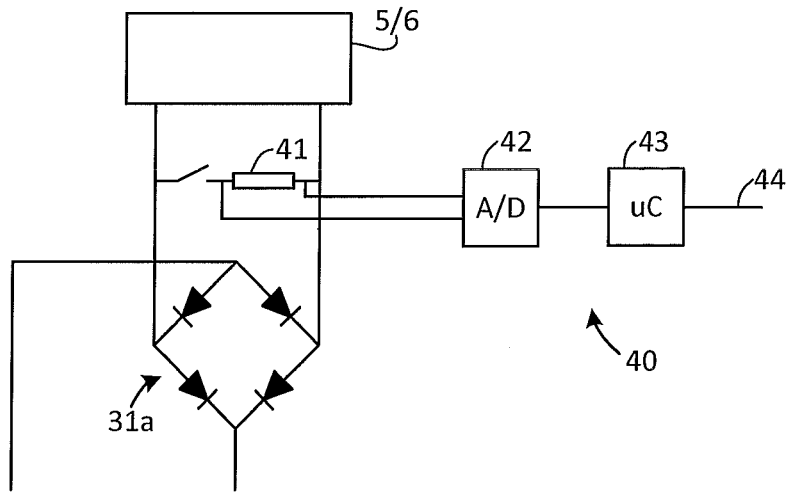
FIG. 9 shows a schematic representation of a further embodiment of a circuit for discriminating between ballast types for an LED lamp arrangement.

Ballast detection may also be achieved by measuring the slope (rate of change) of the voltage or the current supplied by the ballast, since the slope for an electronic ballast will be higher than for a magnetic ballast. This can be implemented, for example, with a load across the ballast, and an A/D circuit for sampling the voltage across the load over time. The circuit may comprise a microcontroller for sampling the voltage. In one implementation, for example configured as shown in FIG. 9, the amplitude of the voltage across the load is compared against a fixed train of clock pulses (at a much higher frequency compared to an electronic ballast) of a microcontroller. The microcontroller can be programmed to determine the difference in the amplitude of the load voltage over a short time period, e.g. 1 microsecond or a certain number of clock periods, to provide an indication of the slope of the ballast output current. Since the output frequency of the magnetic and electronic ballasts vary widely, the slope will also vary and can be used to discriminate between the different types of ballast.

Figure 10:
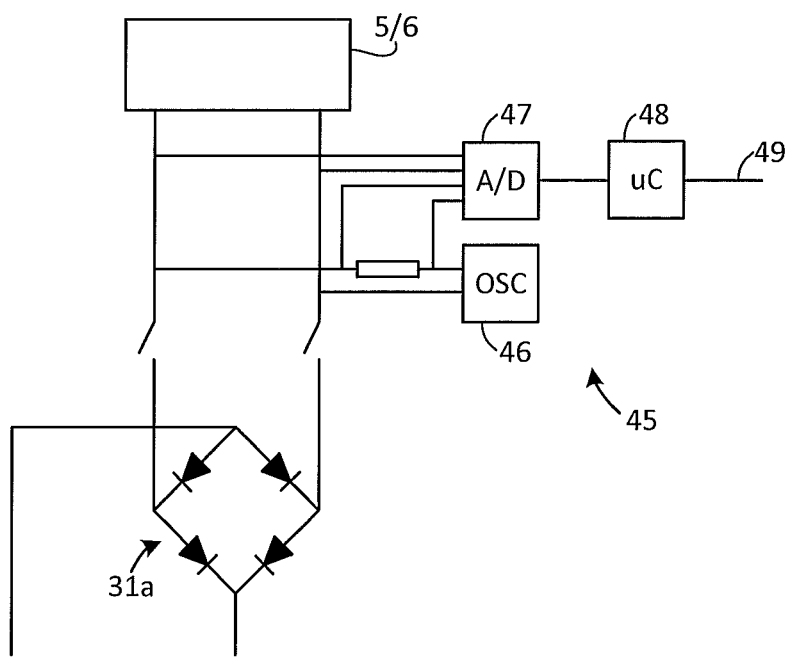
FIG. 10 shows a schematic representation of another embodiment of a circuit for discriminating between ballast types for an LED lamp arrangement.

The output impedance of the ballast may also be measured to discriminate between ballast types. Generally a magnetic ballast will have an output impedance which is predominantly inductive in nature, while an electronic ballast will have an output impedance which is predominantly capacitive in nature. In one implementation shown in FIG. 10, the ballast output impedance can be checked by a circuit 45 comprising an oscillator 46, A/D circuit 47, and microcontroller 48. The ballast 5/6 is disconnected from the LEDs, and a predetermined voltage signal applied, e.g. by the oscillator 46, across the output terminals of the ballast 5/6 and the resulting voltage and current measured by the A/D circuit 47, enabling determination of the output impedance by the microcontroller 48 and generation of an output 49 indicating whether a magnetic or magnetic ballast is present.

The current drawn by the LED lamp arrangement may also be measured to discriminate between ballast types. In one implementation, when power is applied to the LED lamp arrangement, the switching circuit connects the LEDs into a circuit configuration suitable for an electronic ballast, e.g. with at least a portion of the groups of LEDS connected in parallel to other groups of LEDs. The LEDs turn on and the total current flowing through all the LEDs is measured, e.g. by measuring voltage across a sensing resistor in series with the LEDs. A microcontroller or microprocessor may be used to compare the peak value of the measured current against a predetermined threshold value. If the peak value of measured current (at nominal voltage) is higher than the threshold, indicating a magnetic ballast is supplying power to the LED lamp arrangement, then the switching circuit is commanded to connect the LEDs into a circuit configuration suitable for a magnetic ballast, e.g. with all of the groups of LEDS connected in series with each other. If the peak value of measured current (at nominal voltage) is lower than the threshold, indicating an electronic ballast is supplying power to the LED lamp arrangement, then the switching circuit maintains the LEDs in a circuit configuration suitable for a electronic ballast.

Figure 6:
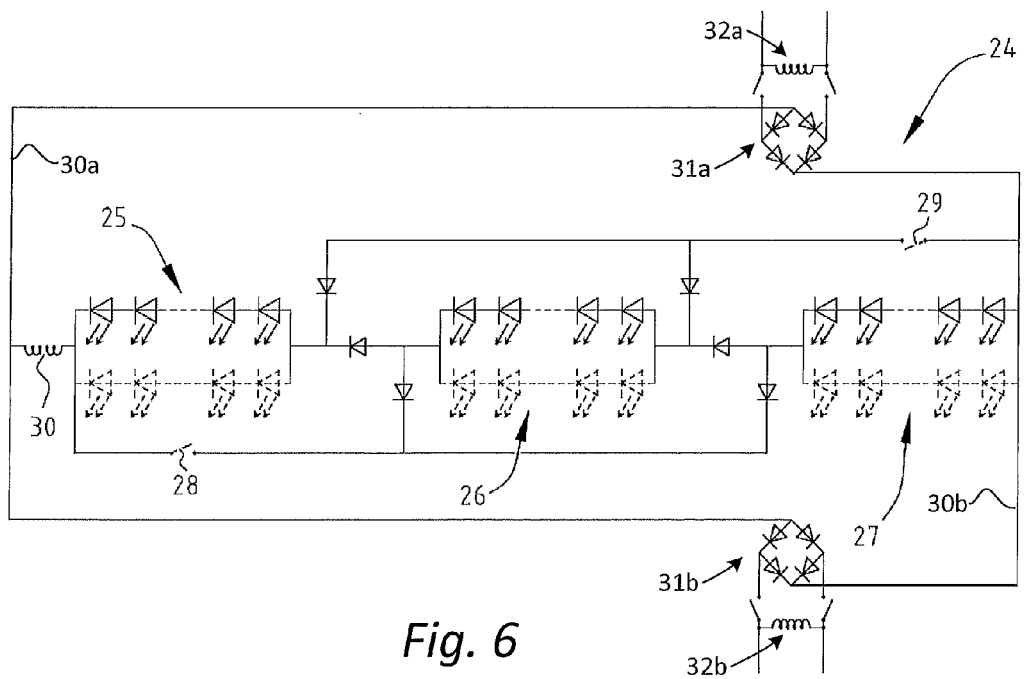
FIG. 6 shows a schematic representation of another embodiment of an LED lamp arrangement.

FIG. 6 shows another example with an LED lamp arrangement 24 having three groups 25, 26 and 27 of LEDs, each group comprising the same number of LEDs. In similar fashion as in the embodiment of FIG. 5, the configuration of the three groups of LEDs can be switched between a series configuration and a parallel configuration using configuration switches 28 and 29. This embodiment includes multiple connecting diodes (similar to the connecting diode 23 in the FIG. 5 embodiment) to enable the configuration switches to produce different circuit configurations, and these can be replaced by a switch, provided the control thereof is suitable. The configuration switches may be constituted and controlled as described below.

Figure 8:
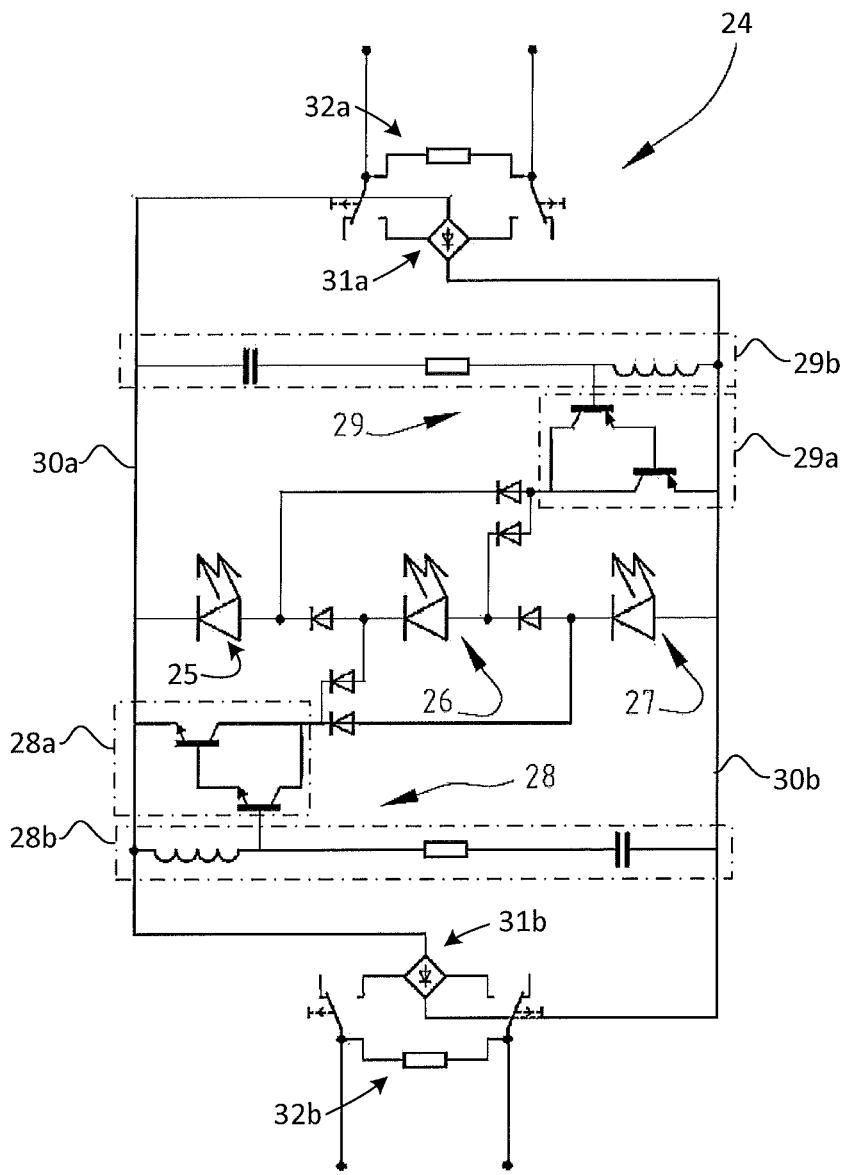
FIG. 8 shows a schematic representation of a further embodiment of an LED lamp arrangement.

FIG. 8 depicts a more detailed representation of the arrangement of FIG. 6, with the groups 25, 26 and 27 of LEDs represented as a single LED symbol for simplicity. The embodiment shown in FIG. 8 comprises two configuration switches 28 and 29, which each comprise a transistor switch 28a, 29a and a frequency detection circuit 28b, 29b. The switches 28a, 29a can comprise, for example, simple transistor switches, Darlington switches and charge pump driven transistors, relays and/or other types of electronic or electromechanical switches. The frequency detection circuits 28b, 29b distinguish between a magnetic ballast and an electronic ballast and provide an appropriate input to control the switches 28a, 29a. A simple implementation of the frequency detection circuits 28b, 29b is a filter, such as an inductor, resistor, capacitor circuit as shown in FIG. 8, an active filter, an any circuit which can generate an output which discriminates between a high frequency (e.g. from an electronic ballast) and a low frequency (e.g. from a magnetic ballast).

Reference is made here to the below table, comprising an example of results for a magnetic ballast and an electronic ballast, both with a fluorescent lamp and an arrangement according to the invention.

TABLE 2.1

| | Magnetic ballast | | Electronic ballast | |
|---|---|---|---|---|
| | Fluorescent tube | LEDs | Fluorescent tube | LEDs |
| Absorbed power | 36 | 28 | 40 | 31 |
| Power factor | 0.42 | 0.82 | 0.98 | 0.96 |
| Reactive power | 49 | 6 | 1 | 1 |
| Apparent power | 61 | 29 | 40 | 31 |

With respect to selection of the number of LEDs in each group and composition of the group, and number of LEDs the total string, the following is noted in addition to the above description.

At a start of a design process, one or more LEDs are selected having characteristics desired for the design determined in view of considerations known to the skilled person. An analytical model is created of the selected LED. Such a model can be as complicated as desired, but a simple linear model comprising an ideal diode to represent the asymmetric V-I (volt-to-current) characteristic, a voltage source to represent the forward voltage of the LED, and a resistor to represent the series resistance of the LED is sufficient in most cases. An analytical model is also created of the magnetic ballast. The dominant characteristic of a magnetic ballast is that of an inductor and the simplest model would be that of an ideal inductor having the same inductance as the ballast (determined at the operating frequency).

These two models can be combined into one model and this model can be analysed either mathematically or analytically to yield a relationship between a number of LEDs and the power absorbed by these LEDs. The complexity and accuracy of this relationship are expected to depend on the complexity and accuracy of the models chosen to determine this relationship, the range in which the models have been linearized and the method of finding the relationship. At this point in the design process the accuracy of the model of the system may be checked with empirical tests using the selected LEDs and the models adjusted if necessary.

Next, the electronic ballast needs to be modelled. The main problem encountered when modelling an electronic ballast is the complexity of electronic ballasts and the large spread in driving mechanisms between different brands and types of electronic ballasts. One approach is to measure and characterize a reference electronic ballast from a predetermined set up or operation point for a particular type of fluorescent tube, for instance on the basis of an IEC specification of fluorescent tube which is to be replaced. This may then be linearized, converted into a model and combined with the LED model. Thereafter, in much the same way as with the magnetic ballast, a relationship between the number of LEDs and the power may be deduced.

This process may be repeated for several numbers of parallel LED strings of equal or different length, considering that more LEDs in parallel connection imply fewer LEDs in series connection and, therefore, lower power.

Figure 13:
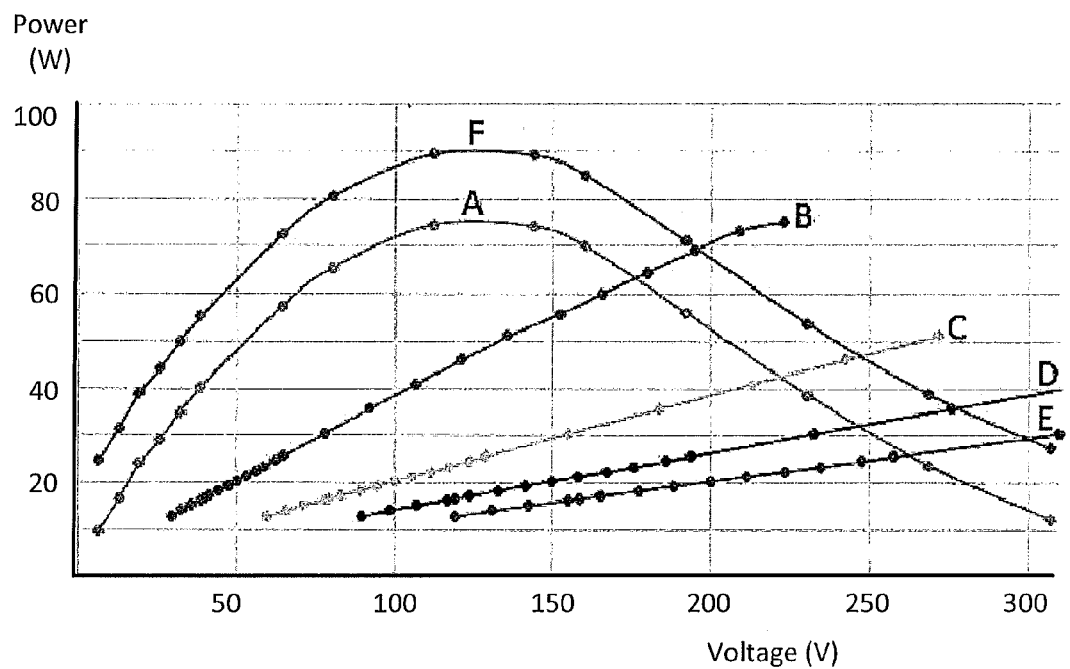
FIG. 13 shows a combined representation of power characteristics for a modelled magnetic ballast (curve A) and a modelled electronic ballast (curves B, C, D, and E), for several different configurations of LED groups, and for a modelled magnetic ballast (curve F) that uses synchronous switching of the circuit configuration.

All relationships are then plotted in a single graph, yielding a set of curves such as depicted in FIG. 13 (the shape of the curves and values will vary depending on many factors such as type and wattage of the ballasts, type and temperature of the LEDs, supply voltage and frequency, and the like). The curves show power along the vertical axis plotted against the total forward voltage of an LED string driven by the ballast along the horizontal axis. Curve A shown in FIG. 13 shows a modelled characteristic for a magnetic ballast driving the LED string composed of the selected type of LEDs arranged in a circuit configuration having a certain number of LEDs connected in series and parallel to achieve a certain forward voltage for the LED string. Curves B to E show modelled characteristics for an electronic ballast, for multiple variations of the circuit configuration of the LED string composed of the selected type of LED but having variable numbers of LEDs connected in series and parallel. Curve F illustrates the change to curve A for a magnetic ballast when line regulation is used as described herein.

It is considered desirable in most circumstances to design the LED lamp arrangement to have equal power consumed when used with both magnetic and electronic ballasts. Thus, the optimal operating points are considered to be most appropriately chosen at intersections of the relevant curves. These intersections are however only theoretical operating points as they rarely intersect on whole numbers of LEDs (i.e. a positive integer) included in the LED string. For example, when the LED string comprises groups of LEDs which are switched between a series connection and a parallel connection, the number of parallel groups of LEDs (e.g. for electronic ballast operation) is preferably the same as the number of series groups of LEDs (e.g. for magnetic ballast operation).

To have the LED lamp arrangement operate at other powers or to have the different circuit configurations of the LED lamp arrangement operate at powers closer together, the characteristics will have to be shifted in such a way that the intersections are on or near the desired points. To achieve this, an embodiment which includes a line regulation circuit is subsequently disclosed herein, in which an offset effectively shifts the whole voltage/power curve of the LED string or group on a magnetic ballast up, which can be accomplished by selecting the duty cycle of the switching circuit at a chosen mains voltage. The LED power is then increased for each point on the graph and the intersection can be shifted to any power level (albeit still limited to integer LED values in the electronic ballasted configuration)

A method for determining a total number of LEDs in the LED string is described below. First, the number of parallel LED groups is determined by choosing the electronic ballast curve that intersects with the magnetic ballast characteristic closest to, but always below the desired power. The length of the substring in each parallel group is then chosen by picking the number of LEDs that result in a power, on the previously mentioned electronic ballast curve, that is closest to the desired power. The offset of the line regulation circuit is then chosen so that the characteristic of the magnetic ballast is shifted up so that power output for the number of LEDs resulting from a multiplication of the number of groups with the number of LEDs per group is either equal to the power of the electronic ballast or to the desired power, depending on design preference.

Line Regulation and Synchronous Switching

Electronic ballasts are typically designed to actively control output current and output power and compensate for variations in voltage of the AC mains power supply. Magnetic ballasts generally do not provide such compensation, and lamps (fluorescent or LED) connected to such a ballast will exhibit varying power consumption and varying light output in response to these variations in AC mains voltage.

Xxx PARA NUMBERING

To compensate for these variations in the power supply voltage, the LED lamp arrangement may include a line regulation circuit or device. For such embodiment, the voltage/power curve of the magnetic ballast is not modelled at nominal AC mains voltage (e.g. 220 VAC) but at the maximum expected AC mains voltage value taking into account the maximum permitted deviation in voltage (e.g. 220 VAC+10% maximum deviation). In this manner, all AC mains voltage values below that maximum value (including the nominal and minimum expected AC mains voltage values) will result in power consumption by the LEDs in the lamp below the desired maximum output, which may then be increased in the manner described below.

Figure 14:
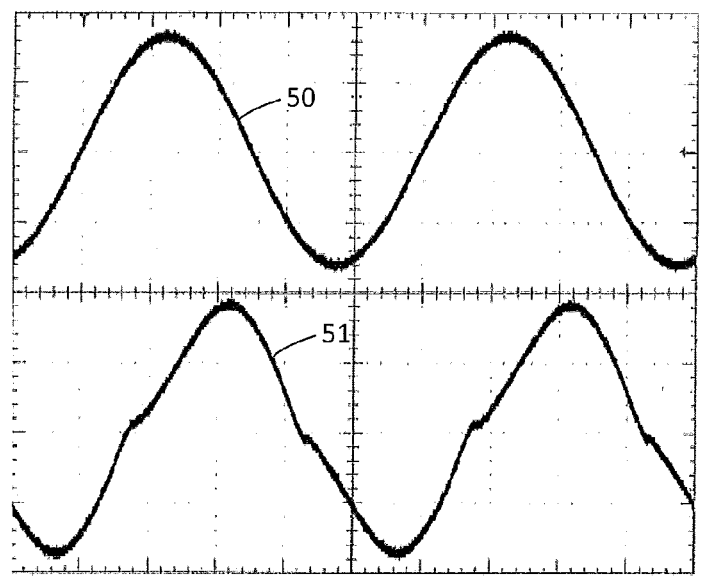
FIG. 14 shows an oscilloscope measurement of an input voltage to a magnetic ballast and output current from a magnetic ballast in a luminaire fitted with a conventional fluorescent lamp.

The alternating voltage of the AC mains power supply in combination with the nearly static forward voltage of the LEDs causes a time period during which the input current to the luminaire is essentially zero. This is illustrated in FIG. 14, which shows an oscilloscope measurement of an input voltage to a magnetic ballast and output current from a magnetic ballast in a luminaire fitted with a conventional fluorescent tube. As can be seen, the output current waveform exhibits a small time period of zero or nearly zero current (referred to hereafter as the zero-current period). This zero-current period occurs when the voltage applied across the LEDs, e.g. the voltage on power supply lines 30*a*, 30*b*, falls below the load voltage of the LEDs, which in normal operation amounts to the total forward voltage of the LED string. Where the luminaire includes a full-wave rectifier, this zero-current period occurs twice in each mains voltage cycle, e.g. at 100 Hz or 120 Hz.

A magnetic ballast effectively shortens this zero-current period due to its inductance, but in most practical configurations the period remains, ending at the moment the instantaneous AC mains voltage rises above the load voltage of the arrangement. The LED lamp arrangement may optionally include means for lowering the load voltage during the zero-current period to further reduce the length of the zero-current time period.

In an exemplary embodiment, the circuit configuration of the LEDs can be changed, for example by bypassing (shorting) or disconnecting one or more of the LED groups, or by switching one or more of the LED groups into a parallel configuration in parallel with one or more other LED groups, during at least a portion of the zero-current period. This lowers the load voltage (i.e. the forward voltage across the LED string) with respect to the instantaneous voltage at the input to the ballast, which reduces the time needed for the instantaneous supply voltage to exceed the load voltage so that current flows again through the LEDs.

The circuit configuration of the LEDs can be changed using a dedicated controlled switch, or using one or more of the LED circuit configuration switches, to reduce the load voltage. This switch, from a circuit configuration with a higher load voltage to a circuit configuration with a lower load voltage, increases the instantaneous voltage across the magnetic ballast which leads to a faster rise of the current through the LEDs. The time interval with essentially zero current is shortened and the power factor is increased. The average or RMS current supplied to the LEDs can be controlled by varying the time when the circuit configuration is switched to the low load voltage. The switch to the low load voltage configuration may be accomplished by feed forward compensation based on input voltage or closed loop regulation based on the actual, measured LED current.

An exemplary embodiment according to this aspect of the invention is depicted in FIG. 7. In this embodiment, control circuit 34 senses current flow through the LEDs and controls switch 28 on the basis of this current. In this embodiment, control circuit 34 senses current flowing through one or more of the groups of LEDs 25, 26, 27 by sensing voltage across impedance 33 through which the LED current flows. In this embodiment, control circuit 34 also receives two inputs, one input indicating the sensed current and a second input from a frequency detector 35. Control circuit 34 may be adapted to close switch 28 when the control circuit 34 receives both an input from frequency detector 35 indicating a frequency in the range expected for a magnetic ballast, and an input indicating sensed LED current is below a threshold, e.g. zero or nearly zero.

In this embodiment, switch 29 is controlled by an input from frequency detector 35, and remains closed when frequency detector 35 indicates an electronic ballast is used and remains open when frequency detector 35 indicates a magnetic ballast is used.

For example, line regulation may be enabled during magnetic ballast operation in which switch 29 is closed, producing e.g. a magnetic ballast circuit configuration. When switch 28 is open, LED groups 27 and 26 are connected in parallel, and the LED group 25 is in series with the combination of LED groups 26 and 27. In that configuration, the total LED voltage drop is twice the total LED voltage drop of one of the single LED groups. Closing of the switch 28 results in all LED groups (25, 26, and 27) being connected in parallel, which effectively reduces the total LED voltage drop to the total voltage drop of a single LED group. Thus, closing of the switch 28 results in lowering of the voltage at the LED load, and, as explained above, this reduction causes an increase in the ballast voltage which produces the faster rise in current. In the shown embodiment, the switch 28 is a switch solely dedicated to line regulation. Alternatively, one or more of the switches that are used for changing the circuit configuration, as described above in relation to the FIG. 5 embodiment, can be configured to further operate as line regulation switches.

Because of the low switching frequency, typically 100 or 120 Hz, used for the line regulation, there is little electromagnetic interference at radio frequencies.

Losses of the magnetic ballast are also slightly reduced compared to operation with standard fluorescent tubes. The smaller difference between the LED voltage drop in the arrangement and the AC mains voltage reduces the Volt× Seconds product on the magnetic ballast inductor (i.e. saturation of the inductor takes longer) and thus slightly reduces the magnetizing losses. The smaller RMS or average current also leads to slightly reduced resistive losses. Greater overall efficiency and lower operating temperature, which increases the ballast's lifetime, are further advantages of this embodiment. Results of measurements of a practiced embodiment according to this aspect of the invention, and a fluorescent tube at comparable light levels are shown in the following table:

TABLE 3.1

|  | Input power (W) | Ballast loss (W) | Power factor |
|---|---|---|---|
| T8 fluorescent Tube with magnetic ballast | 64.0 | 9.8 | 0.48 |
| LED arrangement without line regulation circuit | 39.0 | 1.2 | 0.82 |
| LED arrangement with line regulation circuit | 39.0 | 1.1 | 0.93 |

Figure 15:
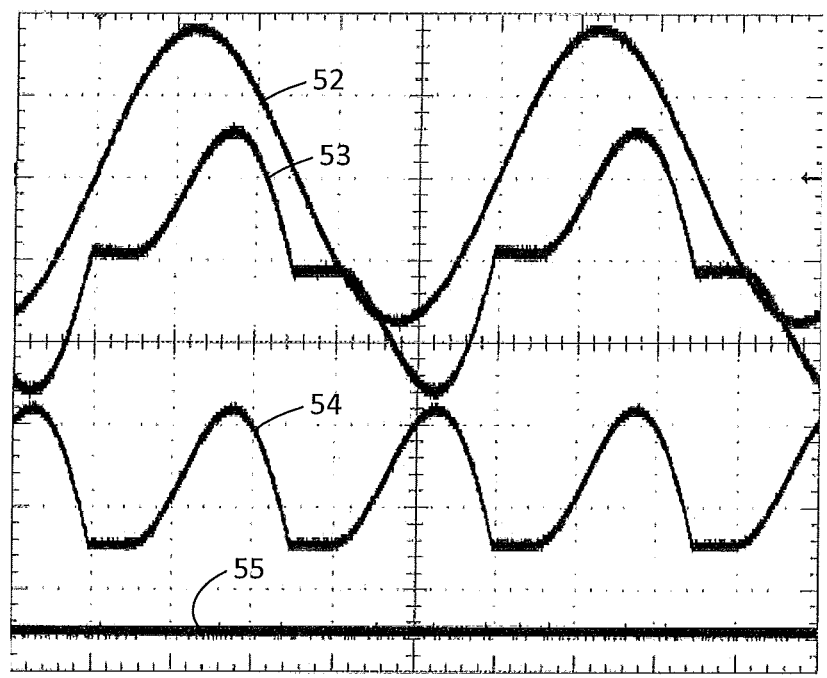
FIG. 15 shows an oscilloscope measurement of an input voltage, input current, rectified current to the load, and switch current in an embodiment of an LED lamp arrangement without line regulation circuit.
Figure 16:
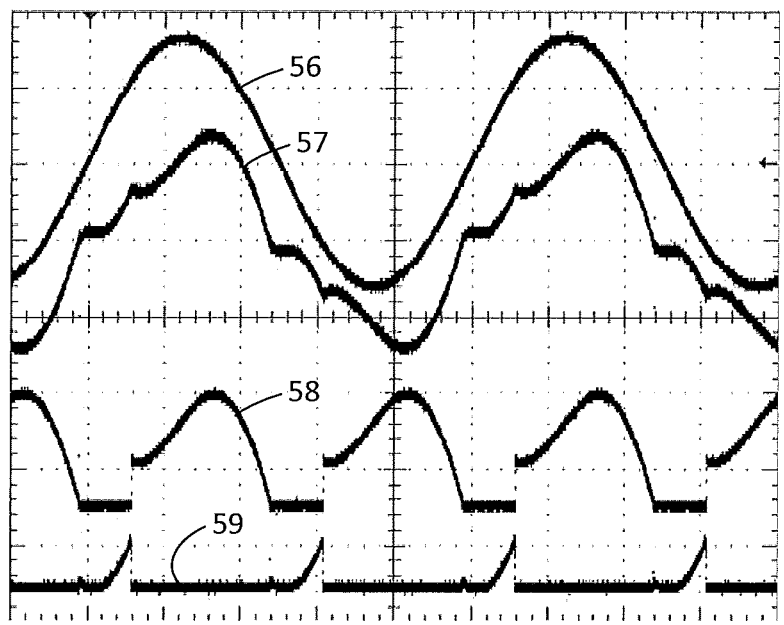
FIG. 16 shows an oscilloscope measurement of an input voltage, input current, rectified current to the load and switch current in an embodiment of an LED lamp arrangement with a line regulation circuit.

FIGS. 15 and 16 show the improvement of the voltage and current waveforms obtained by using line regulation (also referred to as synchronous switching) according to this embodiment. FIG. 15 shows the input voltage 52, input current 53, current 54 through the LEDs, and current 55 through the switch 28, for non-switched operation. FIG. 16 shows the input voltage 56, input current 57, current 58 through the LEDs, and current 59 through switch 28, for synchronous switched operation (i.e. switching the controlled switch simultaneously with the zero current period) at the same LED power level.

Flicker Reduction

Because both the electronic and magnetic ballasts output alternating current, the LEDs powered by these ballasts are continually cycled on and off, causing the LEDs to flicker. Electronic ballasts operate at high frequencies (usually in excess of 20 kHz) and this flicker falls outside the sensitivity range of the human eye. Magnetic ballasts operate at mains frequency (usually 50 or 60 Hz) and when a full-wave rectifier is used the LEDs flicker at twice that frequency. This flicker is perceptible to the human eye and for this and other reasons is highly undesirable. According to a further optional aspect of the invention, the LED arrangement may include means to reduce or eliminate this flicker.

This may be effected by directing part of the electrical energy from the power supplied to the LED arrangement away from the LEDs into a storage element during at least part of the period of peak light output from the LEDs, and directing part of the stored electrical energy back from the storage element to the LEDs during at least part of the period of low light output from the LEDs. This effectively reduces flicker by averaging the peaks and valleys in light output. Storing and retrieving only part of the energy supplied to the LEDs greatly improves efficiency compared to doing so for all the energy supplied to the LEDs.

Figure 11:
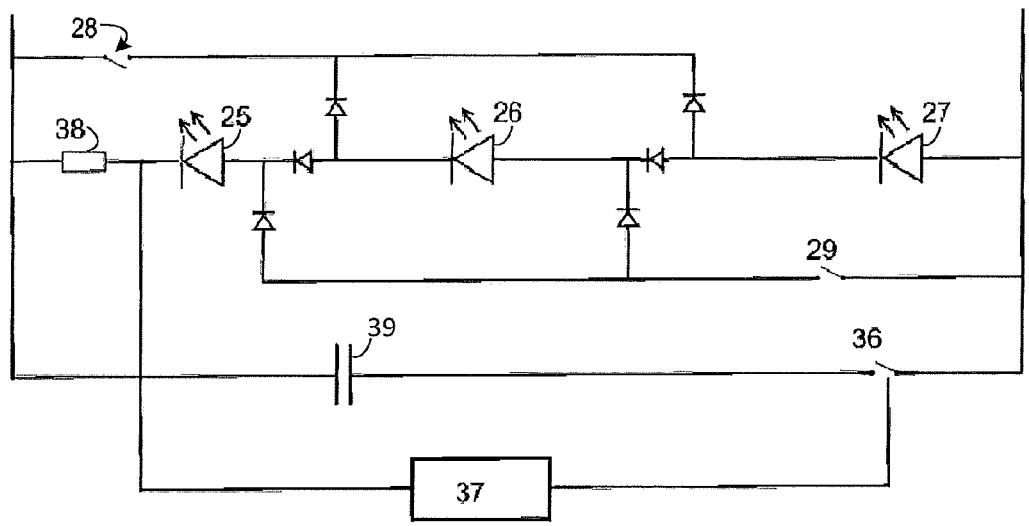
FIG. 11 shows a schematic representation of an energy storage circuit for an LED lamp arrangement.

An exemplary embodiment is illustrated in FIG. 11, which shows a portion of the LED lamp arrangement described in previous embodiments with the addition of a control circuit 37 controls a switch 36 to effect storage and retrieval of energy into and out from energy storage element 39.

In this embodiment the control circuit 37 senses the current flowing through at least a portion of the LEDs and controls switch 36 on the basis of the sensed current. In this embodiment, control circuit 37 senses current flowing through one or more of the groups of LEDs 25, 26, 27 by sensing voltage across resistor 38 through which the LED current flows. Control circuit 37 controls switch 36 to selectively connect energy storage element 39 to the power supply to the LEDs. In this embodiment, closing switch 36 connects energy storage element 39 across the power supply to the LEDs (i.e. the output lines 30a, 30b from rectifiers 31a, 31b shown in FIGS. 5-8) so that current flows into the energy storage element 39.

Control circuit 37 is configured to close switch 36 when the sensed current rises above a first predetermined threshold, and open switch 36 when the sensed current falls below a second predetermined threshold (which may be equal to the first predetermined threshold) to disconnect energy storage element 39. Current through the LEDs generally varies according to the (full-wave rectified) AC voltage of the power supply to the LEDs. The first and second predetermined thresholds are set so that energy is stored in energy storage element 39 during peaks in each cycle of the alternating current through (a portion of) the LEDs. When the sensed current falls below a third predetermined threshold the control circuit 37 closes switch 36 again to connect energy storage element 39 across the power supply lines and across the LEDs, and when the sensed current rises above a fourth predetermined threshold (which may be equal to the third predetermined threshold) the control circuit 37 opens switch 36 to once again disconnect energy storage element 39. The third and fourth predetermined thresholds are set so that energy storage element 39 is connected across the LEDs to release the stored energy during valleys in each cycle of the alternating current through (a portion of) the LEDs.

The control circuit 37 may be implemented as one or more comparator circuits or may comprise more complex logic implemented in hardwired circuits or circuits or processor using firmware of software. Switch 36 may be implemented as a simple transistor switch or more complex switching or variable impedance circuit. Energy storage element 39 may be implemented as a simple capacitor or circuit element capable of storing electrical energy. Control circuit 37 may sense current through all or a portion of the LEDs, using a simple resistor as described in the embodiment of FIG. 11 or other circuit arrangement for sensing current. Control circuit 37 may alternatively be arranged to sense voltage of the power supply or across all or a portion of the LEDs, or sense phase of the cycle of the alternating current or voltage.

In some embodiments, the first and second configuration switches (depicted as switches 28 and 29 in FIG. 11) may also or alternatively be closed to draw current from the energy storage element into the LEDs.

The control circuit 37 may also include a frequency detection circuit or be configured to receive input from a separate frequency detection circuit, e.g. as described for the embodiments shown in FIGS. 5, 6, 8, so that, for example, the energy storage circuit is enabled based on the type of ballast detected. In an exemplary embodiment, the control circuit 37 is configured so that the energy storage circuit is only enabled when a magnetic ballast has been detected.

Starter Removal

In a further embodiment the LED lamp arrangement is optionally provided with means to render unnecessary the removal of a starter from a fluorescent luminaire. A starter is normally used to ignite a fluorescent tube when used with a magnetic ballast. The starter usually consists of a switch, either mechanical or electrical, that periodically short-circuits the magnetic ballast to the mains in series with the heater coils in the ends of the fluorescent tube. After the fluorescent lamp ignites, the voltage across the starter drops below a certain voltage impeding the starter from operation and further short-circuiting the lamp.

Because the LED lamp arrangement operates at considerably higher voltage than the fluorescent tube it replaces, the starter, which is configured to be automatically enabled by the higher voltage during the initial power-up period before the current has risen to its normal operational value, will continue to periodically short-circuit the filaments of the lamp to the ballast, causing undesirable low-frequency flicker.

The starter may be removed from the luminaire to prevent this from happening, but failure of the end-user to do so may result in unsafe situations and destruction of the LED lamp arrangement. Another solution is to place a high impedance element across the pins of the LED lamp arrangement, i.e. where the heater coils are located in a fluorescent tube, with an impedance sufficiently high to prevent the starter from detecting the high voltage on the other side of the tube. This solution, however, will cause some electronic ballasts to wrongfully detect the end of life of the tube, causing it to shut down.

Figure 12:
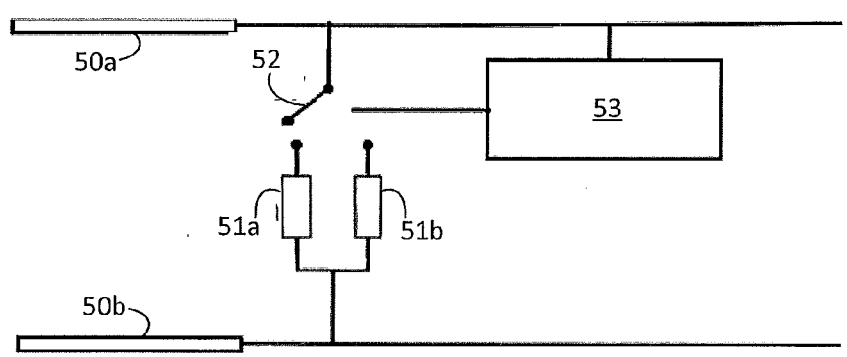
FIG. 12 shows a schematic representation of a variable impedance circuit for an LED lamp arrangement.

To address this problem, a further embodiment of the LED lamp arrangement may optionally include a variable impedance connected across the connectors of the LED lamp arrangement, e.g. the pins for connecting the LED lamp arrangement into a conventional fluorescent luminaire in the location usually used for a heater coil in a fluorescent tube. The presence of either a magnetic or an electronic ballast in the system is detected, and the variable impedance is adjusted to a high or a low impedance value depending on the detected type of ballast. An exemplary embodiment is depicted in FIG. 12, in which control circuit 53 controls a switch 52 to connect either a high impedance 51a or a low impedance 51b across the pin connectors 50a, 50b of the LED lamp arrangement. The variable impedance can be connected across one or both pairs of connectors present in the luminaire.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An LED lamp arrangement adapted to replace a fluorescent lamp in a luminaire having a ballast for supplying power to the lamp, the LED lamp arrangement comprising:
  a plurality of LEDs arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration;
  a first circuit adapted to generate an output indicating whether the ballast is a magnetic ballast or a non-magnetic ballast; and
  second circuit adapted to change a connection of the plurality of groups of LEDs between the first circuit configuration and the second circuit configuration on the basis of the output of the first circuit, wherein the first circuit configuration comprises a greater number of the LEDs connected in a series string than the second circuit configuration, and wherein the second circuit is adapted to connect the plurality of groups of LEDs into the first circuit configuration when the output from the first circuit indicates the ballast is a magnetic ballast.

2. The LED lamp arrangement of claim 1, wherein the first circuit configuration corresponds to a series connection of all of the groups of LEDs.

3. The LED lamp arrangement of claim 1, wherein the second circuit configuration corresponds to a parallel connection of at least a portion of the groups of LEDs.

4. The LED lamp arrangement of claim 3, wherein the second circuit is adapted to connect the plurality of groups of LEDs into the second circuit configuration when the output from the first circuit indicates the ballast is a non-magnetic ballast.

5. The LED lamp arrangement of claim 1, wherein the second circuit is adapted to connect the plurality of groups of LEDs into the first circuit configuration in which the plurality of groups of LEDs are connected in series when the output from the first circuit indicates the ballast is a magnetic ballast, and into the second circuit configuration in which at least a portion of the groups of LEDs are connected in parallel when the output from the first circuit indicates the ballast is a non-magnetic ballast.

6. The LED lamp arrangement of claim 1, wherein, during operation, a voltage drop across the first circuit configuration is higher than a voltage drop across the second circuit configuration.

7. The LED lamp arrangement of claim 1, wherein the first circuit comprises a sensing circuit adapted to sense a frequency of power supplied to the LED lamp arrangement, the first circuit generating the output indicating whether the ballast is a magnetic ballast or a non-magnetic ballast on the basis of the sensed frequency.

8. The LED lamp arrangement of claim 7, wherein the first circuit and the second circuit are adapted to connect the plurality of groups of LEDs in the second circuit configuration if the sensed frequency is within a certain predetermined frequency range.

9. The LED lamp arrangement of claim 8, wherein the predetermined frequency range corresponds to a frequency range output from one of a magnetic ballast or an electronic ballast.

10. The LED lamp arrangement of claim 7, wherein the first circuit and the second circuit are adapted to connect the plurality of LEDs in the first circuit configuration if the sensed frequency is within a first predetermined frequency range, and to connect the plurality of LEDs in the second circuit configuration if the sensed frequency is within a second predetermined frequency range different from the first predetermined frequency range.

11. The LED lamp arrangement of claim 10, wherein the first predetermined frequency range corresponds to a frequency range output from a magnetic ballast and the second predetermined frequency range corresponds to a frequency range output from an electronic ballast.

12. The LED lamp arrangement of claim 1, wherein the first circuit comprises a sensing circuit adapted to sense harmonic content of voltage or current supplied to the LED lamp arrangement, the first circuit generating the output indicating whether the ballast is a magnetic ballast or a non-magnetic ballast on the basis of the sensed harmonic content.

13. The LED lamp arrangement of claim 1, wherein the first circuit comprises a sensing circuit adapted to sense rate of change of voltage or current supplied to the LED lamp arrangement, the first circuit generating the output indicating whether the ballast is a magnetic ballast or a non-magnetic ballast on the basis of the sensed rate of change.

14. The LED lamp arrangement of claim 1, wherein the first circuit comprises a sensing circuit adapted to sense output impedance of the ballast supplying power to the LED lamp arrangement, the first circuit generating the output indicating whether the ballast is a magnetic ballast or a non-magnetic ballast on the basis of the sensed output impedance.

15. The LED lamp arrangement of claim 1, wherein the first circuit comprises a sensing circuit adapted to sense an amplitude of current or voltage supplied to the LED lamp arrangement, the first and second circuit cooperating to sense current or voltage when the LED lamp arrangement is connected in one of the first circuit configuration or the second circuit configuration, wherein the first circuit generates the output indicating whether the ballast is a magnetic ballast or a non-magnetic ballast on the basis of the sensed amplitude.

16. The LED lamp arrangement of claim 1, wherein the plurality of LEDs, the first circuit and the second circuit are arranged in a single housing in a configuration suitable to replace a fluorescent lamp in a luminaire.

17. The LED lamp arrangement of claim 1, wherein, in operation, the arrangement is adapted to generate a power output of the plurality of LEDs in the first circuit configuration used with one of a magnetic or electronic ballast which is substantially equivalent to a power output of the plurality of LEDs in the second circuit configuration used with the other of a magnetic or electronic ballast.

18. The LED lamp arrangement of claim 1, wherein, in operation in a luminaire, the light flux level produced by the plurality of LEDs connected in one of the first or second circuit configurations used with a magnetic ballast is substantially equivalent to the light flux level produced by a fluorescent tube used with the magnetic ballast.

19. The arrangement of claim 1, further comprising:
a third circuit for sensing a condition indicating that current through at least a portion of the plurality of LEDs is below a threshold, and generating an output; and
a fourth circuit adapted to change a connection of the plurality of groups of LEDs of the LED lamp arrangement:
between the first circuit configuration and a third circuit configuration on the basis of the output of the third circuit; or
between the second circuit configuration and a third circuit configuration on the basis of the output of the third circuit.

20. The arrangement of claim 19, wherein the fourth circuit for switching the circuit configuration is adapted to switch between the first circuit configuration and another circuit configuration, or between the second circuit configuration and another circuit configuration, at a duty cycle.

21. The arrangement of claim 20, wherein the duty cycle is selected to reduce a difference between a power output of the plurality of LEDs in the first and second circuit configurations.

22. The arrangement of claim 19, wherein the fourth circuit for switching the circuit configuration is adapted to switch between the circuit configurations at a duty cycle which is determined at least in part on the basis of the output of the first circuit.

23. The arrangement of claim 19, wherein the third circuit for sensing a condition when current through at least a portion of the plurality of LEDs is below a threshold is adapted to measure current flowing through at least a portion of the plurality of LEDs.

24. The arrangement of claim 19, wherein the third circuit for sensing a condition when current through at least a portion of the plurality of LEDs is below a threshold is adapted to measure voltage applied to at least a portion of the plurality of LEDs.

25. The arrangement of claim 19, wherein the third circuit for sensing a condition when current through at least a portion of the plurality of LEDs is below a threshold is adapted to measure phase of a voltage applied to at least a portion of the plurality of LEDs.

26. The arrangement of claim 19, wherein the second circuit for switching the circuit configuration of the plurality of LEDs and the fourth circuit for switching the circuit configuration of the plurality of LEDs are embodied at least in part in the same circuit element or elements.

27. The arrangement of claim 19, wherein the third circuit for sensing a condition when current through at least a portion of the plurality of LEDs is below a threshold is configured for activating the fourth circuit for switching the circuit configuration of the plurality of LEDs during at least a portion of the time period when current through at least a portion of the plurality of LEDs is substantially zero.

28. A luminaire adapted for using one or more fluorescent lamps, the luminaire comprising one or more magnetic or electronic ballasts suitable for energizing the fluorescent lamps, wherein the luminaire is fitted with one or more LED lamp arrangements according to claim 1 in place of the one or more fluorescent lamps.

29. A control circuit adapted for operation in a luminaire having a ballast for supplying power to an LED lamp arrangement, the LED lamp arrangement comprising a plurality of LEDs arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration, the control circuit comprising:
- a first circuit adapted to generate an output indicating whether the ballast is a magnetic ballast or a non-magnetic ballast; and
- a second circuit adapted to change a connection of the plurality of groups of LEDs of the LED lamp arrangement between the first circuit configuration and the second circuit configuration on the basis of the output of the first circuit,
- wherein the first circuit configuration comprises a greater number of the LEDs connected in a series string than the second circuit configuration, and
- wherein the second circuit is adapted to connect the plurality of groups of LEDs into the first circuit configuration when the output from the first circuit indicates the ballast is a magnetic ballast.

30. A method of operating an LED lamp arrangement adapted to replace a fluorescent lamp in a luminaire having a ballast for supplying power to the lamp, the arrangement comprising a plurality of LEDs arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration, the method comprising:
- generating an output signal indicating whether the ballast is a magnetic ballast or a non-magnetic ballast; and
- changing a connection of the plurality of groups of LEDs between the first circuit configuration and the second circuit configuration on the basis of the output signal,
- wherein the first circuit configuration comprises a greater number of the LEDs connected in a series string than the second circuit configuration, and
- wherein changing a connection of the plurality of groups of LEDs comprises connecting the plurality of groups of LEDs into the first circuit configuration when the output from the output signal indicates the ballast is a magnetic ballast.

31. The method of claim 30, wherein the first circuit configuration corresponds to a series connection of all of the groups of LEDs.

32. The method of claim 30, wherein the second circuit configuration corresponds to a parallel connection of at least a portion of the groups of LEDs.

33. The method of claim 32, wherein changing a connection of the plurality of groups of LEDs comprises connecting the plurality of groups of LEDs into the second circuit configuration when the output signal indicates the ballast is a non-magnetic ballast.

34. The method of claim 30, wherein changing a connection of the plurality of groups of LEDs comprises connecting the plurality of groups of LEDs into the first circuit configuration in which the plurality of groups of LEDs are connected in series when the output signal indicates the ballast is a magnetic ballast, and into the second circuit configuration in which at least a portion of the groups of LEDs are connected in parallel when the output signal indicates the ballast is a non-magnetic ballast.

35. The method of claim 30, wherein a voltage drop across the first circuit configuration is higher than a voltage drop across the second circuit configuration.

36. The method of claim 30, wherein generating the output signal comprises sensing a frequency of power supplied to the LED lamp arrangement, and generating the output indicating whether the ballast is a magnetic ballast or a non-magnetic ballast on the basis of the sensed frequency.

37. The method of claim 36, comprising connecting the plurality of groups of LEDs in the second circuit configuration if the sensed frequency is within a certain predetermined frequency range.

38. The method of claim 37, wherein the predetermined frequency range corresponds to a frequency range output from one of a magnetic ballast or an electronic ballast.

39. The method of claim 36, comprising connecting the plurality of LEDs in the first circuit configuration if the sensed frequency is within a first predetermined frequency range, and connecting the plurality of LEDs in the second circuit configuration if the sensed frequency is within a second predetermined frequency range different from the first predetermined frequency range.

40. The method of claim 39, wherein the first predetermined frequency range corresponds to a frequency range output from a magnetic ballast and the second predetermined frequency range corresponds to a frequency range output from an electronic ballast.

41. The method of claim 30, wherein generating the output signal comprises sensing an amplitude of current or voltage supplied to the LED lamp arrangement when the LED lamp arrangement is connected in one of the first circuit configuration or the second circuit configuration, and generating the output indicating whether the ballast is a magnetic ballast or a non-magnetic ballast on the basis of the sensed amplitude.

42. The method of claim 30, wherein the LED lamp arrangement generates a power output of the plurality of LEDs in the first circuit configuration used with one of a magnetic or electronic ballast which is substantially equivalent to a power output of the plurality of LEDs in the second circuit configuration used with the other of a magnetic or electronic ballast.

43. The method of claim 30, wherein, in operation in a luminaire, the light flux level produced by the plurality of LEDs connected in one of the first or second circuit configurations used with a magnetic ballast is substantially equivalent to the light flux level produced by a fluorescent tube used with the magnetic ballast.

\* \* \* \* \*